(12) United States Patent  (10) Patent No.: US 7,161,722 B2
Brotherton-Ratcliffe et al.  (45) Date of Patent: Jan. 9, 2007

(54) HOLOGRAPHIC PRINTER

(75) Inventors: David Brotherton-Ratcliffe, West Sussex (GB); Alexey Rodin, Vilnius (LT)

(73) Assignee: Geola Technologies Ltd., West Sussex (GB)

( * ) Notice: Subject to any disclaimer, the term of this patent is extended or adjusted under 35 U.S.C. 154(b) by 0 days.

(21) Appl. No.: 10/492,730

(22) PCT Filed: Oct. 16, 2002

(86) PCT No.: PCT/GB02/04683

§ 371 (c)(1),
(2), (4) Date: Oct. 7, 2004

(87) PCT Pub. No.: WO03/034155

PCT Pub. Date: Apr. 24, 2003

(65) Prior Publication Data

US 2005/0052717 A1   Mar. 10, 2005

(30) Foreign Application Priority Data

Oct. 16, 2002  (GB) ................................. 0124807.9

(51) Int. Cl.
*G03H 1/20*  (2006.01)
(52) U.S. Cl. ............................. 359/12; 359/22; 359/32
(58) Field of Classification Search .................. 359/12, 359/22, 30, 32
See application file for complete search history.

(56) References Cited

U.S. PATENT DOCUMENTS

| | | | |
|---|---|---|---|
| 3,818,129 A | 6/1974 | Yamamoto | |
| 3,832,027 A * | 8/1974 | King | ............................ 359/23 |
| 3,843,225 A | 10/1974 | Kock | |
| 4,037,919 A | 7/1977 | Takeda et al. | |
| 4,206,965 A | 6/1980 | McGrew | |
| 4,338,578 A | 7/1982 | Sukhman | |
| 4,421,380 A | 12/1983 | McGrew | |
| 4,498,740 A | 2/1985 | Caulfield | |
| 4,701,006 A | 10/1987 | Perimutter | |
| 4,719,160 A | 1/1988 | Gerhart et al. | |
| 4,778,262 A | 10/1988 | Haines | |
| 4,832,445 A | 5/1989 | Haines | |
| 4,834,476 A | 5/1989 | Benton | |
| 4,886,720 A | 12/1989 | Ueda | |
| 4,907,034 A | 3/1990 | Doi et al. | |
| 4,964,684 A | 10/1990 | Iovine | |
| 4,969,700 A | 11/1990 | Haines | |
| 5,022,727 A | 6/1991 | Smith | |
| 5,046,792 A | 9/1991 | Zabka | |
| 5,121,402 A | 6/1992 | Scheps | |
| 5,138,471 A | 8/1992 | McGrew | |
| 5,151,714 A | 9/1992 | Okino et al. | |
| 5,194,971 A | 3/1993 | Haines | |
| 5,237,433 A | 8/1993 | Haines et al. | |
| 5,260,814 A | 11/1993 | Smith et al. | |
| 5,265,108 A | 11/1993 | Benda | |
| 5,295,143 A | 3/1994 | Rao et al. | |
| 5,317,577 A | 5/1994 | Urakami et al. | |

(Continued)

FOREIGN PATENT DOCUMENTS

DE   198 09 402   8/1997

(Continued)

*Primary Examiner*—Fayez G. Assaf
(74) *Attorney, Agent, or Firm*—Madan, Mossman & Sriram P.C.

(57) ABSTRACT

A holographic printer is disclosed which produces an intermediate hologram H3 and uses the intermediate hologram H3 to produce a white light viewable hologram H2.

55 Claims, 24 Drawing Sheets

U.S. PATENT DOCUMENTS

| | | | |
|---|---|---|---|
| 5,475,511 | A | 12/1995 | Haines et al. |
| 5,519,517 | A | 5/1996 | Redfield et al. |
| 5,734,485 | A | 3/1998 | Buchkremer et al. |
| 5,740,190 | A | 4/1998 | Moulton |
| 5,793,503 | A | 8/1998 | Haines et al. |
| 5,796,500 | A | 8/1998 | Hart |
| 5,801,857 | A * | 9/1998 | Heckenkamp et al. ......... 359/2 |
| 5,802,086 | A | 9/1998 | Hargis et al. |
| 5,838,431 | A | 11/1998 | Hara et al. |
| 5,894,489 | A | 4/1999 | Halldorsson et al. |
| 5,949,559 | A | 9/1999 | Kihara et al. |
| 5,973,806 | A | 10/1999 | Campbell et al. |
| 5,973,807 | A | 10/1999 | Buchkremer et al. |
| 6,002,704 | A | 12/1999 | Freitag et al. |
| 6,009,110 | A | 12/1999 | Wiechmann et al. |
| 6,081,381 | A | 6/2000 | Shalapenok et al. |
| 6,088,140 | A | 7/2000 | Klug et al. |
| 6,163,391 | A | 12/2000 | Curtis |
| 6,199,794 | B1 | 3/2001 | Naiman et al. |
| 6,266,167 | B1 | 7/2001 | Klug et al. |
| 6,304,237 | B1 | 10/2001 | Karakawa |
| 6,330,088 | B1 | 12/2001 | Klug et al. |
| 6,541,731 | B1 | 4/2003 | Mead et al. |
| 6,930,811 | B1 | 8/2005 | Brotherton-Ratcliffe et al. |
| 6,963,431 | B1 * | 11/2005 | Holzbach et al. ............. 359/23 |
| 6,982,817 | B1 | 1/2006 | Halldorsson |
| 7,003,004 | B1 | 2/2006 | Rodin et al. |
| 7,009,742 | B1 | 3/2006 | Brotherton-Ratcliffe et al. |
| 7,042,605 | B1 | 5/2006 | Brotherton-Ratcliffe et al. |
| 2003/0156308 | A1 | 8/2003 | Brotherton-Ratcliffe et al. |
| 2005/0050280 | A1 | 3/2005 | Yap et al. |
| 2005/0052717 | A1 | 3/2005 | Brotherton-Ratcliffe et al. |

FOREIGN PATENT DOCUMENTS

| | | |
|---|---|---|
| EP | 0 355 274 | 5/1989 |
| EP | 0 697 631 | 2/1996 |
| EP | 0 929 018 | 1/1999 |
| WO | WO 98/26328 | 6/1998 |
| WO | WO 00/29909 | 5/2000 |
| WO | WO 01/42861 | 6/2001 |

* cited by examiner

HOLOGRAPHIC PRINTER

The present invention relates to a holographic printer.

Since the 1950s holograms have been produced by the technique of illuminating a physical object with coherent light and arranging that the scattered light falls onto a photosensitive recording material that is additionally illuminated by a mutually coherent reference beam (see for example E. N. Leith et al., "Reconstructed Wavefronts and Communication Theory", Journal of the Optical Society of America 53, 1377–81 1963). This basic technique suffers from the fact that a physical object is required in order to produce the holographic representation. Furthermore, the size of the holographic image must usually correspond in a 1:1 fashion to the size of the physical object being holographed. Such restrictions render this technique fundamentally unsuitable for most practical applications. Another technique whereby the fundamental interference pattern that characterizes a hologram is calculated and then directly written onto a substrate is disclosed in U.S. Pat. No. 4,701, 006). However the preferred-process of writing by electron beam is costly and slow. In addition, for large holograms the magnitude of computation is usually prohibitive even with today's computational resources.

A technique for the generation of holograms not requiring an actual object was proposed by King et al (Applied Optics, 1970). In this paper it was shown that holograms could be composed by optically multiplexing information taken from a plurality of perspective views consisting of conventional 2-D photographs. In the case that such photographs were generated by computer no physical object was required at all (see for example U.S. Pat. No. 3,843,225).

According to this approach, many conventional and sequential views of an object are recorded by a camera mounted on a linear or circular track. Each of these views is then used in an optical system to multiplex the data together so as to form an intermediate H1 hologram as described in U.S. Pat. No. 3,832,027. Such a hologram can then be converted or transferred to a second hologram which is now white light viewable and is known as an H2 hologram. In order to do this, the H1 hologram is illuminated by laser light in a time-reversed geometry and the real image so produced is used as the object for the H2 hologram. Upon illumination of this H2 hologram by a time-reversed reference beam a white light viewable virtual image is reconstructed. Efficient and practical commercial machines that convert H1 holograms to H2 holograms now exist (see for example M. V. Grichine, D. B. Ratcliffe, G. R. Skokov, "An Integrated Pulsed-Holography System for Mastering and Transferring onto AGFA or VR-P Emulsions" Proc. SPIE Vol. 3358, p. 203–210, Sixth International Symposium on Display Holography, Tung H. Jeong; Ed.).

Holographic printing techniques which implicitly require the generation of an intermediate, or H1, hologram which is thereafter used to produce a final white light viewable hologram are referred to as 2-step holographic printing processes. The basic features of conventional 2-step holographic printing are explained in U.S. Pat. No. 3,832,027. Subsequent work (e.g. Spierings W. et al., "Development of an Office Holoprinter II", SPIE Vol. 1667 Practical Holography VI 1992) replaced the photographic film used in U.S. Pat. No. 3,832,027 with an LCD screen.

An elementary 2-step holographic printer, as described by Spierings et al., and based on U.S. Pat. No. 3,832,027, consists of an optical vibration isolation table on which is mounted a traditional split-beam continuous-wave holography set-up. The object beam of this set-up illuminates a diffusion screen which is mounted parallel to, and which is laterally displaced from, the photosensitive substrate onto which the hologram is to be recorded. A computer image is thus projected in laser light onto the diffusion screen and the image is changed at each of a plurality of exposures. The photosensitive substrate is covered by a slit or rectangular aperture that is moved in a regular fashion with each exposure, thus defining an effective holographic pixel of similar shape. A mutually coherent reference beam co-illuminates this holographic pixel producing the required wave-interference on the photosensitive substrate. Exposures are continued until all the photosensitive substrate has been exposed sequentially by the aperture. The projected images are chosen to represent appropriate perspective views of either real or computer generated objects from the viewpoint determined by the position of the middle of the aperture slit (single-parallax case) or by the position of the middle of the rectangle (full-parallax case).

Due to the reliance of the above method on a continuous wave laser and the intrinsic use of a diffusion screen onto which the image, in laser light, is projected, the holographic printer is impractically bulky and exceedingly sensitive to vibration resulting in long write times. The holographic printer is not therefore commercially viable.

An alternative scheme to a 2-step holographic printing process is described in U.S. Pat. No. 4,206,965 whereby photographic images are directly multiplexed onto the final white light viewable hologram in the form of many long thin slit holograms located side by side, avoiding the need for an intermediate H1 hologram.

All holographic printing schemes in which the final white light viewable hologram is printed directly without the need to generate an intermediate (H1) hologram are referred to hereinafter as 1-step methods.

U.S. Pat. No. 4,421,380 describes a system for producing 1-step full-colour transmission holograms from 3 interlaced strip or point composite holograms of the achromatic type by the inclusion of a registered colour-filter mask. U.S. Pat. No. 4,778,262 describes a 1-step method for writing directly a two dimensional matrix of basic holograms from computer data. U.S. Pat. No. 5,138,471 describes a similar technique wherein a one dimensional spatial light modulator is connected to a computer to directly write (1-step) common types of holograms as a two-dimensional matrix of basic holograms. U.S. Pat. No. 4,834,476 describes another similar 1-step technique based on computational or sequential camera data whose use was described for the direct writing of curved composite holograms having either a reflection or transmission geometry but which technique could be generalized to more conventional flat holograms.

U.S. Pat. No. 4,964,684 describes the use of a spatial light modulator to help solve the problems of vibration in a real 2-step holographic printer that produces an intermediate H1 hologram from computer or camera data. U.S. Pat. No. 5,949,559 describes a method for directly writing a holographic stereogram that has superior quality by canceling optical noise through the use of various moving diffuser screens. European application EP-0816952 describes a technique for realizing higher quality composite holograms by using an imaged mask instead of a real mask. Japanese patent application JP-11084992 describes a vibration isolation system for a holographic printing system that reduces the effect of vibration and consequently improves hologram image quality. U.S. Pat. No. 5,973,807 describes the production of tiled holographic stereograms from camera or computer data via the intermediate step of multiple H1 holograms which are copied using a specific transfer process to form a larger composite display.

Yamagushi et al. ("Development of a prototype full-parallax holoprinter", Proc. Soc. Photo-Opt Instrum. Eng (SPIE) vol. 2406, Practical Holography IX, pp50–56 February 1995 and "High Quality recording of a full-parallax holographic stereogram with digital diffuser", Optical Letters vol 19, no 2 pp 135–137 Jan. 20, 1994) describes a more advanced monochrome 1-step holographic printer based on a CW laser. The device was able to produce small full-parallax white-light reflection holograms. However, it took 36 hours to write even a small hologram of 320×224 holopixels. In addition to only producing monochrome holograms further disadvantages of the system are that it can only produce holographic pixels of one size and it is unable to produce transmission type holograms. WO00/29909 (Klug et al.) overcomes some of the problems inherent with the system disclosed by Yamagushi et al. This application describes a 1-step holographic printer that is capable of producing 3-colour white light viewable full parallax reflection holograms having a wide angle of view. This development is, however, still based on CW lasers and consequently suffers from very slow printing speeds, a complex design and quality problems linked to vibrational interference.

In many cases a 2-step method of generating an intermediate H1 hologram from computer data and then copying or image-plane transferring the hologram to form a white light viewable hologram is to be preferred over the method of directly writing the final hologram. This is due to a number of reasons. It is frequently preferred to generate restricted parallax holograms, having only horizontal parallax. With the traditional 2-step technique that produces an intermediate H1 hologram, such an H1 hologram may essentially be composed of one or more one-dimensional strips of overlapping holographic pixels. The classical optical transfer technique then takes care of the complex computational step of calculating the distribution of light over the entire two-dimensional surface of the final (H2) hologram. If such a final hologram is written directly as in a 1-step printing scheme then this computation must be done by computer. In addition, for large holograms, the time required to write a two dimensional array of holographic pixels is usually proportional to the square of the time required to write a traditional H1 master hologram and as such can become prohibitively long for some applications. A further problem with directly written 1-step composite holograms is that they can appear pixelated whereas the 2-step technique of using an H1 master hologram is less prone to this problem.

Notwithstanding the above arguments, there are many applications where it is advantageous to directly write the final hologram by a 1-step scheme. Such directly written holograms require lower energy laser radiation than corresponding 2-step holographic printers. They are also more easily tiled together to form ultra-large displays. Also in many applications quick previews of the final hologram are required and it may not convenient to produce an H1 hologram and then to put this hologram into another machine in order to generate the final H2 hologram. The 1-step technique of directly writing holograms also allows the creation of hybrid holograms having non-standard viewing windows., something that is likely be demanded by the printing industry in the context of holographic billboard displays. Further advantages of the 1-step system are that materials such as photopolymers (see for example European patent EP0697631B1) may be used which require only dry processing whereas the more sensitive Silver Halide materials requiring wet processing must be employed for classically copied traditional H2 holograms due to simple energy considerations.

WO01/45943 and WO01/42861 describe a holographic printer based on a multiple colour pulsed laser system. The holographic printer is capable of producing either final 1-step H1 holograms or master H2 holograms for H2:H1 transfer. The holograms can either be reflection or transmission holograms and they may have full or limited parallax. The holograms may also be monochrome, rainbow or full-colour. The printing speed of the holographic printer is several orders of magnitude faster than other known holographic printers. In addition, the holographic printer is compact and the hologram quality is independent of external environmental noise.

The known holographic printer disclosed in WO01/45943 and WO01/42861 will now be described in more detail in relation to FIGS. 1–8. For simplicity and clarity the case of a single monochromatic laser will be considered although it should be understood that the this can be extended to a multiple colour laser system. FIG. 1 shows an overhead view of the holographic printer. A single colour single-frequency pulsed laser 100 capable of rapid operation (typically 20 Hz) and having sufficient temporal coherence emits a beam of coherent light that is split by a variable beam-splitter 101. The beam 102 continues to the mirror 103 whereupon it is diverted to the mirror 104 whereupon it is diverted to the waveplate 105 that controls the polarization of the beam. The beam continues to a telescope comprising lenses 106, 107 and 167. Lens 107 is mounted on a motorized translation stage 108 with motor 109. The diameter of the beam exiting from optic 107 is thus controlled and approximately collimated. The beam passes to a micro-lens array 110 that expands it onto the collimating lens assembly 111. The distance between the elements 110 and 111 is chosen to be the effective focal length of the lens 111. In such a way a collimated beam exits the lens 111 with a controllable spatial coherence. The beam now illuminates a liquid crystal display (LCD) 112, having a resolution 768× 1024 pixels and lateral dimension of 26.4 mm, which is mounted on a 2-D motorized translation stage 116 having vertical control motor 115 and horizontal control motor 118. Positions of maximum LCD horizontal displacement are indicated by 113 and 114. The LCD position is adjusted when writing H1 type holograms and is used to attain a much higher resolution of the final image than would otherwise be possible with the same static LCD for a given angle of view. The LCD position may also be adjusted when writing a 1-step hologram in order to maintain a particular hologram viewing window geometry.

After passing through the liquid crystal display, the beam traverses a linear polarizer that converts the LCD image from a polarization rotation image into amplitude modulation. The beam then passes through a wide-angle objective 119 mounted on the motorized translation stage 120 with motor 163. This stage is used to control the position of the focused image of the LCD produced by the objective 119. The size of the minimum waist 166 of the object beam is controlled by the motorized stage 108 with motor 109. The object beam now comes to bear on the photosensitive material 162 here shown as film mounted on a roll/stage system. The motor 129 controls movement of the stage 123 towards and away from the position of minimum object beam waist. The rollers 124 and 125 control the horizontal movement of the film 162 in front of the object beam. The motor 128 controls the vertical movement of the film in front of said object beam. Motor 126 controls the motion of the rollers 124 and 125. Rollers 122 and 131 tension the film and control the horizontal angle that the film makes to the axial propagation vector of the object beam.

The reference beam is split from the main laser beam by the variable beamsplitter 101 controlled by motor 165. The beam 135 is directed to a mirror 136 whereupon it is reflected through an quasi-elliptical or rectangular aperture 137, an effective image of which is eventually created at the intersection of the reference beam with the holographic recording material, such quasi-elliptical or rectangular shape producing a defined circular or quasi-elliptical or rectangular reference footprint on the recording material as may be required by the type of hologram being written. The reference beam continues to the waveplate 138 that controls the polarization of the laser beam. The elements 139 and 141 with either 164 or 163 form a telescope that controls the size of the beam after 164/163 which is adjustable by the motorized stage 142 with motor 143. The beamsplitter switch 144 either directs the reference beam on the path 154 or onto the path 145. Path 145 is used to create transmission holograms whereas path 154 is used to create reflection holograms.

In the case of path 145 the reference beam passes through the lens 164 that produces an approximate image of the aperture 137 at the recording material surface. This lens also corrects for the slight divergence of the light produced by the lens 141. The divergence of the light after 164, which is ideally collimated, is thus controlled to within diffraction limits. Practically this means that for small reference beam size the beam will not be exactly collimated but that such departure from collimation will lead to an image blurring significantly less than that induced by the source size of the final hologram illumination source. Mirrors 146 and 149 now direct the reference beam onto its target to intersect the object beam at the surface of the holographic recording material. Motorized rotation stages 147 and 150 with motors 148 and 152 respectively and the linear translation stage 151 with motor 153 ensure that different reference angles may be achieved for different placements and orientations of the recording material.

In the case of path 154 the reference beam passes through the lens 163 that produces an approximate image of the aperture 137 at the recording material surface. This lens also corrects for the slight divergence of the light produced by the lens 141. The divergence of the light after 163, which is ideally collimated, is thus controlled to within diffraction limits as above. Mirrors 155 and 156 now direct the reference beam onto its target to intersect the object beam at the surface of the holographic recording material, this time from the opposite side to the object beam. The motorized rotation stage with motor 159 and the linear translation stage 158 with motor 160 ensure that different reference angles may be achieved for different placements and orientations of the recording material.

The holographic printer can function in a variety of different modes. FIG. 2 shows a diagram of the system in H1 transmission mode. The reference beam comes in towards the recording material from the same side as the object beam to form a holographic pixel 121. The holographic pixel 121 is significantly displaced from the point of minimum waist 166. The image of the LCD 112 is located at a distance 201 from the recording material 162 and as such a screen placed at 202 would show a sharply focused image of each 2-D picture loaded into the LCD 112. The plane 202 usually corresponds to the H2 plane in a transfer geometry.

In order to record an H1 transmission hologram, perspective views of a real or computer generated object are pre-distorted to compensate for residual optical distortion and for a certain final lighting geometry. Such images are then loaded into the LCD one by one, a holographic pixel is recorded, and then the recording material is advanced and the process repeated for each image. For the case of the generation of a rainbow transmission master hologram a line of pixels is written onto the holographic recording material as shown in FIG. 6(*a*). Each circle represents an interference pattern containing information about a certain perspective view along a horizontal viewing line. FIG. 6(*b*) illustrates the case pertaining to the generation of an RGB rainbow hologram master where three lines of pixels are written at the achromatic angle each line corresponding to a red, green or blue component image in the axial viewing position of the final hologram. The recording geometry for FIG. 6(*b*) is shown in FIG. 3.

In order to record an H1 transmission hologram suitable for the generation of a white light reflection hologram a grid a pixels having different vertical and horizontal packing densities is written as shown in FIG. 7. If a reflection type master hologram is required then the system is configured as shown in FIG. 4. In order to write a direct one-step reflection hologram, the basic image data is mathematically transformed according to special pixel-swapping rules, with the system configured as shown in FIG. 5, and pixels written as shown in FIG. 8.

Despite the various advantages provided by the known holographic printer, many commercial applications require fundamentally higher speeds of 1-step printing for medium to large-size RGB colour reflection holograms. RGB holopixels at over 20 Hz in one-step mode can be recorded using the holographic printer, but when sufficient resolution is demanded, a 1 m×1 m hologram comprising 1 million RGB pixels will still take nearly 14 hours to print.

The known holographic printer can also produce H1 transmission holograms suitable for the generation of RGB colour reflection holograms H2 by H1:H2 transfer. If the final hologram is to be of restricted parallax, which is frequently the case for larger prints, then the write time of the required master hologram(s) falls within acceptable limits. For example, a RGB master suitable for the production of a high-resolution 1 m×1 m H2 hologram can be printed in around 30 minutes with this technique.

Despite this acceptable write-time, in order to produce a medium to large format H2 hologram of acceptable quality from a master or series of masters, a very high energy multiple-colour laser must be employed in the H1:H2 transfer machine. This is because the quality of RGB colour reflection holograms is limited by Raleigh scattering of the blue component which in turn is controlled by the grain-size of the recording material. In order to obtain acceptable Raleigh scattering in the blue it is necessary to use a smaller grain size than normally employed in conventional holography. This is turns leads to a rather lower sensitivity and hence to the requirement of large energies for the H1:H2 transfer. Typically, for a 1 m×1 m H2 RGB hologram over 4 Joules is required in the blue component alone. Whilst possible to attain, such a laser is highly complex and costly.

Additionally, the fact that large collimated beams and a potentially large distance between the H1 and H2 holograms are required during H1:H2 transfer means that any commercial transfer machine would be particularly bulky.

Thus, although the known holographic printer provides a significant improvement over previous devices each 3D print ties up the holographic printer for a long time if used in a 1-step operation and if used in a 2-step operation the H1:H2 transfer equipment is both bulky and expensive.

Accordingly, it is desired to provide an improved holographic printer.

According to the present invention there is provided a holographic printer as claimed in claim 1.

The holographic printer according to the preferred embodiment comprises one, two or more than two pulsed laser sources. One or more of the pulsed laser sources may produce a laser emission having a wavelength of 946 nm, 1064 nm (or 1053 nm or 1047 nm or 1080 nm or 1070 nm), 1319 nm (or 1313 nm or 1338 nm or 1341 nm or 1351 nm) or in the range 1850–1970 nm.

The laser emission may be frequency doubled to 473 nm, 532 nm (or 526 nm or 523.6 nm or 539.8 nm or 535 nm) or 659 nm (or 656.5 nm or 669 nm or 670.7 nm or 675.5 nm), frequency tripled to 440 nm (or 437.7 nm or 446.0 nm or 447.1 nm or 450.3 nm) or 617–657 nm or frequency quadrupled to a wavelength in the range 463–493 nm.

Preferably, the pulsed laser source comprises a Nd:BEL, Nd:YAG, Nd:YAP or Nd:YLF laser source although in other embodiments a pulsed laser source comprising Tm:YAG, Tm:YAL or Thulium in a host matrix of Potassium Yttrium Ytterbium Tungstate may be used.

At least one pulsed laser source is preferably configured to produce laser emissions of single longitudinal mode and may be configured to produce laser emissions having a temporal coherence length greater than 1 mm. At least one pulsed laser source may comprise a means for modifying the laser emission wavelength by Raman scattering or Raman amplification.

According to a less preferred embodiment, one or more CW laser sources may be used. Preferred CW laser sources include HeNe, Krypton, Argon, Neodymium, dye and HeCd.

Preferably, red and/or green and/or blue laser beams are generated for writing holograms. The red laser beam preferably has a wavelength in the range 615–680 nm, the green laser beam preferably has a wavelength in the range 510–550 nm and the blue laser beam preferably has a wavelength in the range 430–480 nm.

According to a particularly preferred embodiment the final white light viewable hologram may be an RGB white light viewable reflection hologram.

The holographic printer preferably comprises one or more spatial light modulators onto which digital data is displayed for laser-writing onto an intermediate hologram. The digital data may be derived from a real model or from a 3-D computer model. The digital data may be mathematically transformed to correct for optical distortion.

The optical distortion which is corrected may be selected from the group consisting of: (i) H2 emulsion swelling on hologram processing; (ii) reference beam angle errors; (iii) finite emulsion refractive index and emulsion refractive index not equalling recording material substrate refractive index; (iv) required H2 replay wavelength not equalling recording wavelength; (v) required H2 replay reference angle not equalling recording reference angle; and (vi) intrinsic optical distortion of the printer including distortion due to the principle objective(s).

Preferably, the digital data is mathematically transformed by a single simple pixel swap that operates between an initial image data set and a data set displayed on said one or more spatial light modulators.

Preferably, the digital data is mathematically transformed by a series of simple pixel swaps.

According to the preferred embodiment the one or more intermediate holograms (the "H3" hologram(s)) are transmission holograms. The one or more intermediate holograms are formed on a first substrate which may comprise a photosensitive medium, a thermoplastic substrate, a photopolymer substrate or a silver halide emulsion coated substrate.

Preferably the digital data written onto the H3 intermediate hologram(s) is calculated by special transformation of the camera data set and is thus generally different from the digital data that would normally be written onto an H1-type hologram (i.e. untransformed camera data).

According to a less preferred embodiment, the one or more intermediate holograms are reflection holograms which are preferably written on a photosensitive medium.

Preferably, the holographic printer further comprises positioning means for positioning the first substrate so that a holographic pixel is written on the first substrate. The positioning means moves the first substrate so that an array of holographic pixels is formed thereon.

Different colour holographic pixels may be recorded at the same position on the first substrate so that different colour holographic pixels overlap one another. Alternatively, different colour holographic pixels may be recorded at different positions on the first substrate so that different colour holographic pixels do not substantially overlap one another.

Preferably, in the second mode the output from the pulsed laser sources is amplified.

In the second mode a first order diffracted beam may be produced at the intermediate hologram from a selected group of pixels. A second substrate on to which the white light viewable hologram (the "H2" hologram) is to be written is preferably positioned parallel to the first substrate.

Preferably, the second substrate is positioned at a distance d from the first substrate wherein d is greater than zero and less than the distance between the camera (H1) plane and the H2 plane.

Preferably, the second substrate is positioned at a distance d from the first substrate wherein d is greater than zero and less than ¼ of the height of the one or more intermediate holograms.

Preferably, the second substrate is positioned at a distance d from the first substrate wherein d is greater than zero and less than ¼ of the width of the one or more intermediate holograms.

A mask may be arranged adjacent the second substrate so that a portion of the diffracted beam illuminates the second substrate (defining a "super pixel" on the H2). A zeroth order diffracted beam is preferably substantially prevented from illuminating the second substrate.

One or more line-pass optical filters may be placed between the first substrate and the second substrate and the one or more line-pass optical filters may comprise an interference filter.

Super-pixels comprising superimposed red, green and blue holographic pixels are preferably written on to the second substrate. The super-pixels may or may not substantially overlap.

The white light viewable hologram (H2) is preferably a reflection hologram.

According to a second aspect of the present invention there is provided a hologram produced by a 2-step holographic printer.

Preferably, the hologram is a single parallax hologram. Alternatively, the hologram is a full parallax hologram.

According to a third aspect of the present invention, there is provided a method of printing a hologram as claimed in claim 50.

The preferred embodiment represents a significant improvement over the known holographic printer. The known 2-step method requires a large pulsed laser for generating large format RGB white-light reflection holograms. Similarly, the 1-step method requires too long a time to write a large format RGB white-light reflection hologram. The preferred embodiment overcomes these problems by providing a 2-step printer that is capable of producing multiple holograms in a reasonable time frame using only a small laser.

Another advantage of the preferred embodiment over other methods of rapid copy generation (such as the contact copy method proposed in WO00/29908) is that, at H3:H2 transfer, the ratio of the H3 illumination beam energy to the H2 reference beam energy can be adjusted for each colour channel. This allows a higher quality copy to be generated and allows the proper balance of colours on different emulsions without the need for reprinting.

The preferred embodiment also allows the production of holograms that are designed for illumination by a point source, rather than by a collimated reference beam.

The preferred embodiment produces holograms in which the standard pixelisation observed with the known holographic printer is reduced due to the finite distance between the H3 and H2 planes.

The use of a thermoplastic emulsion for the H3 hologram is particularly advantageous in that it avoids much of the inconvenience associated with the known 2-step method.

The preferred embodiment contains a single low-energy multiple-colour pulsed laser. Instead of producing either a 1-step hologram or a conventional H1 (master) hologram the preferred embodiment produces a different type of intermediate hologram known as an H3 hologram from which the same holographic printer can then generate a final RGB white-light viewable H2 reflection hologram. The time required for the generation of the H3 hologram is shorter than the known 1-step H1 hologram generation time. Furthermore, the time required to generate a final H2 colour hologram from the H3 hologram is several orders of magnitude faster than the using a 1-step approach.

The preferred embodiment provides a compact, rugged and relatively simple holographic printer capable of producing multiple high-quality full-colour digital full-parallax reflection holograms of flexible format and on a timescale suited for commercial applications.

The preferred embodiment also provides a single method and apparatus for producing colour or monochromatic reflection holograms from digital data. Such holograms may either be of restricted parallax or full-parallax. In one embodiment the data is generated entirely by a computer as a 3-D (animated) model. In another embodiment the data is generated from multiple 2-D camera images taken of a real 3-D object or scene from a plurality of different camera positions. The data is digitally processed and the various chromatic components are displayed on small high-resolution spatial light modulators that are illuminated by laser radiation.

In a preferred embodiment a compact low-energy pulsed laser system capable of generating emissions at two or more chromatic components is used to record a composite transmission intermediate hologram on a panchromatic holographic emulsion. This intermediate hologram is referred to as an H3 rather than an H1 hologram as the digital data recorded onto it do not correspond to the data recorded onto a traditional H1 hologram.

After recording, the H3 master hologram is chemically processed, dried and reloaded into the holographic printer. The same pulsed laser, operating preferably at a higher energy is then used to illuminate successively, at angles identical to the recording angles, sequential and overlapping small zones of the H3 intermediate hologram, the areas each containing a plurality of recorded H3 holographic pixels. The first order diffracted radiation from each such exposure is then used to expose a plurality of small holograms onto another panchromatic photosensitive plate (the H2 hologram) that is held parallel and laterally displaced to the H3 hologram. The H2 hologram maintains at all times a fixed and static geometrical relationship to the H3 hologram and the ensemble of H2 and H3 is usually moved whilst the laser remains static. The size of each recorded H2 sub-hologram is determined by a static mask in close proximity to the (moving) H2 hologram and by the size of a co-illuminating but oppositely directed reference beam that is brought to bear onto the H2. In conventional H1:H2 transfer the distance between the H1 hologram and the H2 hologram during transfer corresponds to the final optimal viewing distance of the H2 (typically >50 cm) and also to the distance from the H2 to the camera plane. In H3:H2 transfer the H3 is placed much closer to the H2 and neither the final optimum viewing distance of the H2 nor the H2 to camera-plane distance corresponds to this separation. The preferred embodiment thus provides a method whereby an H3 hologram can be very rapidly transferred to an H2 hologram by the same machine that writes the H3 without the need for the high energies required by conventional H1:H2 transfer.

According to a fourth aspect of the present invention, there is provided a 2-step holographic printer as claimed in claim 51.

According to a fifth aspect of the present invention, there is provided a 2-step holographic printer as claimed in claim 52.

Preferably, the data $^{\mu\nu}S_{\alpha\beta}$ is subsequently treated for optical distortions inherent in the writing system and in the viewing geometry of the H2.

Preferably, the data transformations for $^{\mu\nu}S_{\alpha\beta}$ are modified so as to take into account the optical distortions inherent in the writing system and in the viewing geometry of the H2.

Preferably, the terms:

$$u = (\mu - 1)\frac{\Pi}{(N_M - 1)}, \quad \mu = 1, \ldots, N_M$$

$$v = (\nu - 1)\frac{\Sigma}{(N_V - 1)}, \quad \nu = 1, \ldots, N_V$$

are substituted by:

$$u = \frac{\Pi}{2} + \left[(\mu - 1)\frac{\Pi}{(N_M - 1)} - \frac{\Pi}{2}\right]\psi_{\mu\nu} \quad \mu = 1, \ldots, N_M$$

$$v = \frac{\Sigma}{2} + \left[(\nu - 1)\frac{\Sigma}{(N_V - 1)} - \frac{\Sigma}{2}\right]\psi_{\mu\nu} \quad \nu = 1, \ldots, N_V$$

wherein $\psi_{\mu\nu}$ is a function describing optical distortion inherent in the system.

According to a sixth aspect of the present invention, there is provided a holographic copying device as claimed in claim 55.

Preferably, the one or more intermediate holograms (H3) are written on a first substrate and the white light viewable hologram (H2) is to be written on a second substrate.

Preferably, the second substrate on which the white light viewable hologram (H2) is to be written is positioned parallel to the first substrate.

Preferably, the second substrate is positioned at a distance d from the first substrate wherein d is greater than zero and less than the distance between the camera (H1) plane and the H2 plane.

Preferably, the second substrate is positioned at a distance d from the first substrate wherein d is greater than zero and less than ¼ of the height of the one or more intermediate holograms.

Preferably, the second substrate is positioned at a distance d from the first substrate wherein d is greater than zero and less than ¼ of the width of the one or more intermediate holograms.

Various embodiments of the present invention together with other arrangements given for illustrative purposes only will now be described, by way of example only, and with reference to the accompanying drawings in which.

Figure 1:
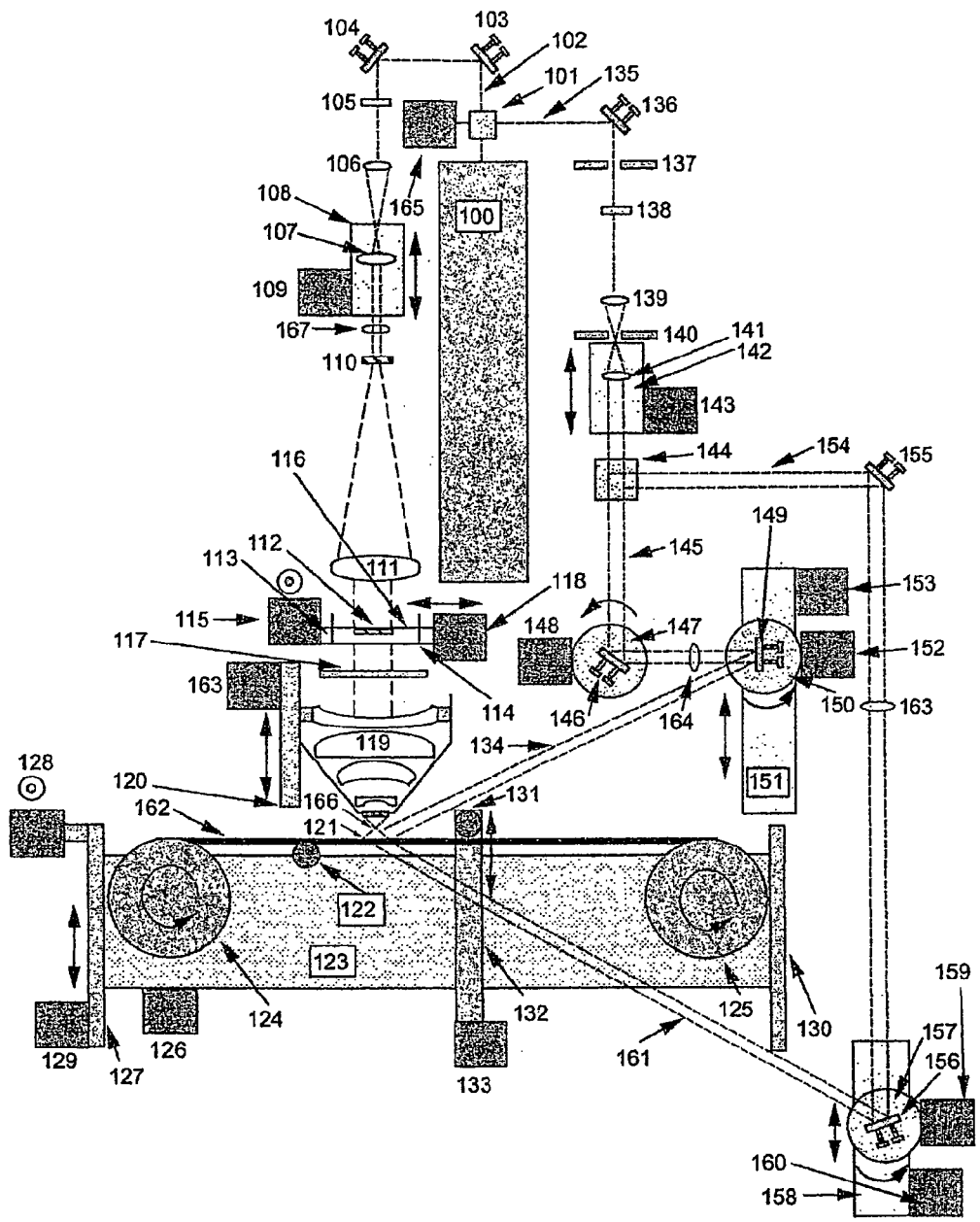
FIG. 1 shows a plan view of a known holographic printer.
Figure 2:
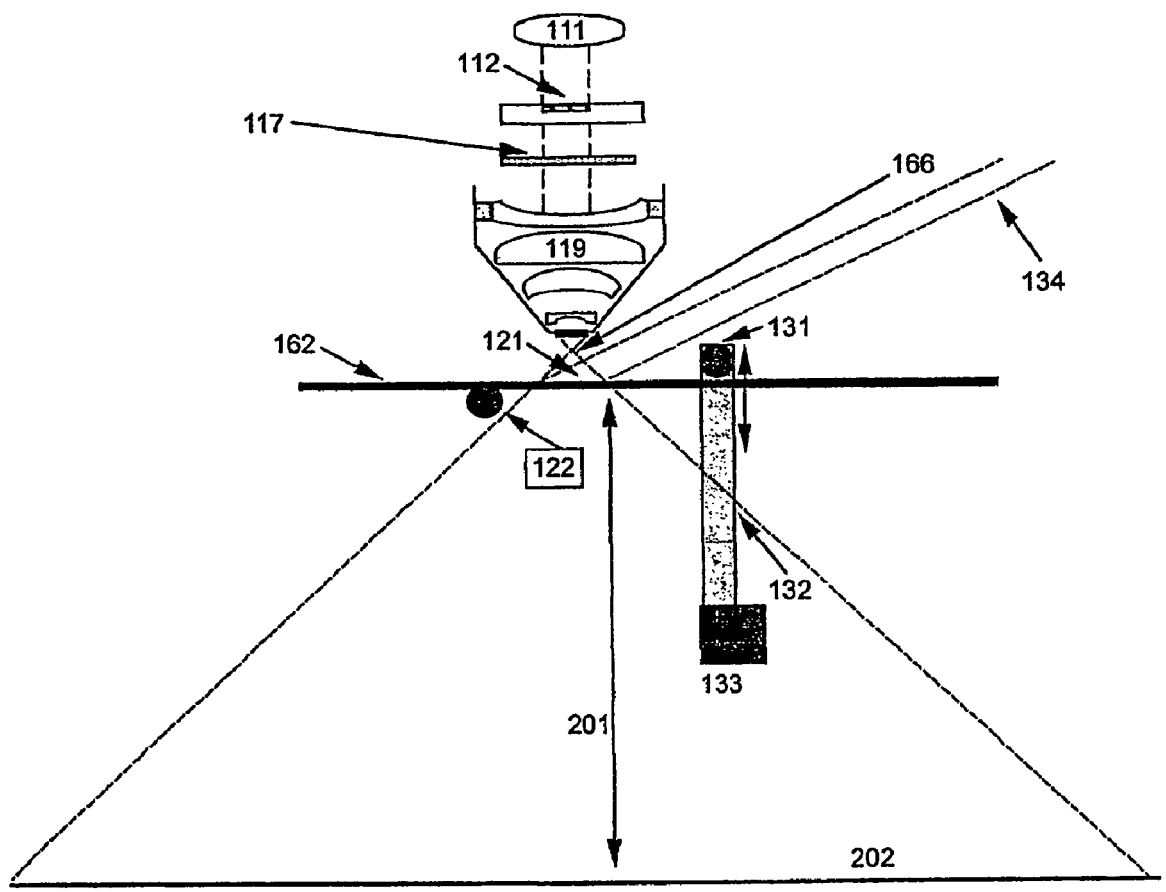
FIG. 2 shows the known holographic printer working in an H1 master hologram writing mode for the case of a transmission H1 hologram.
Figure 3:
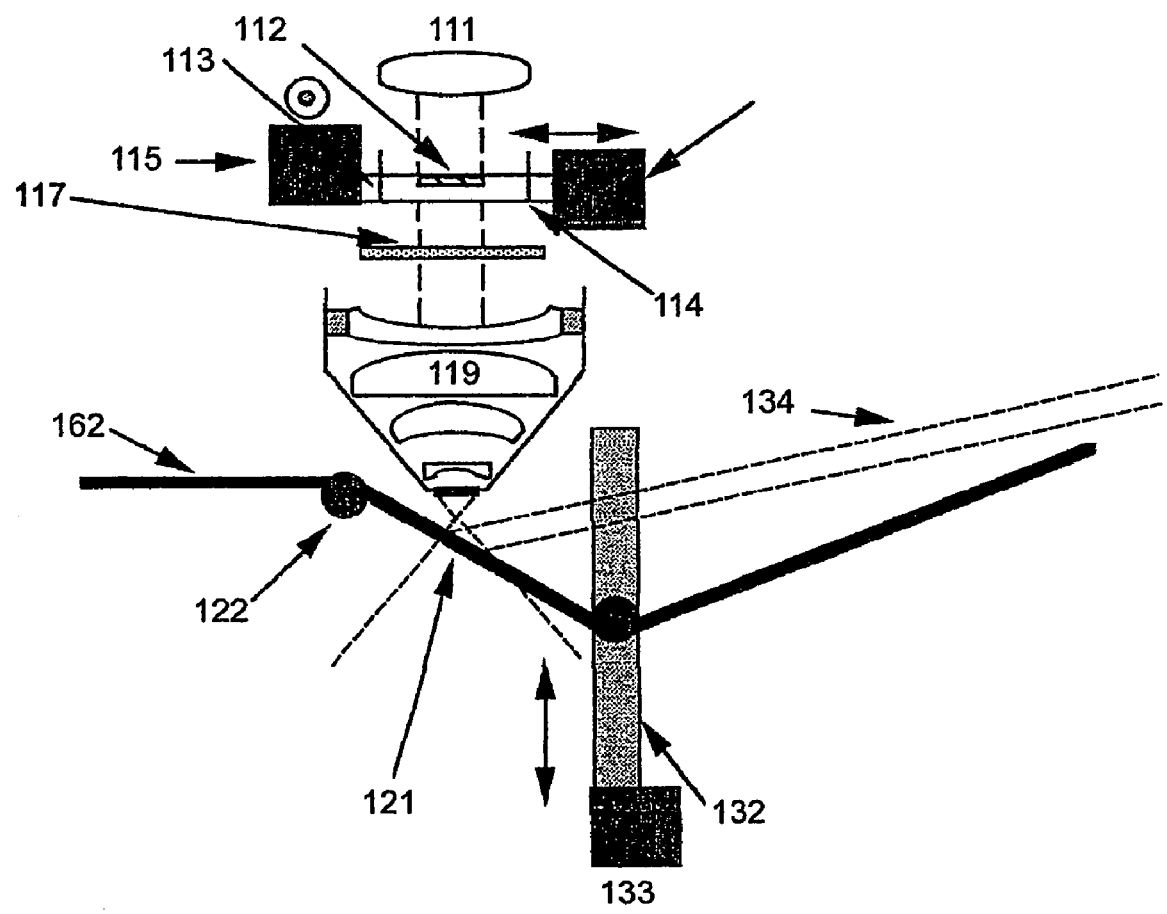
FIG. 3 shows the known holographic printer working in an H1 master hologram writing mode for the case that the holographic recording material is orientated at the achromatic angle.
Figure 4:
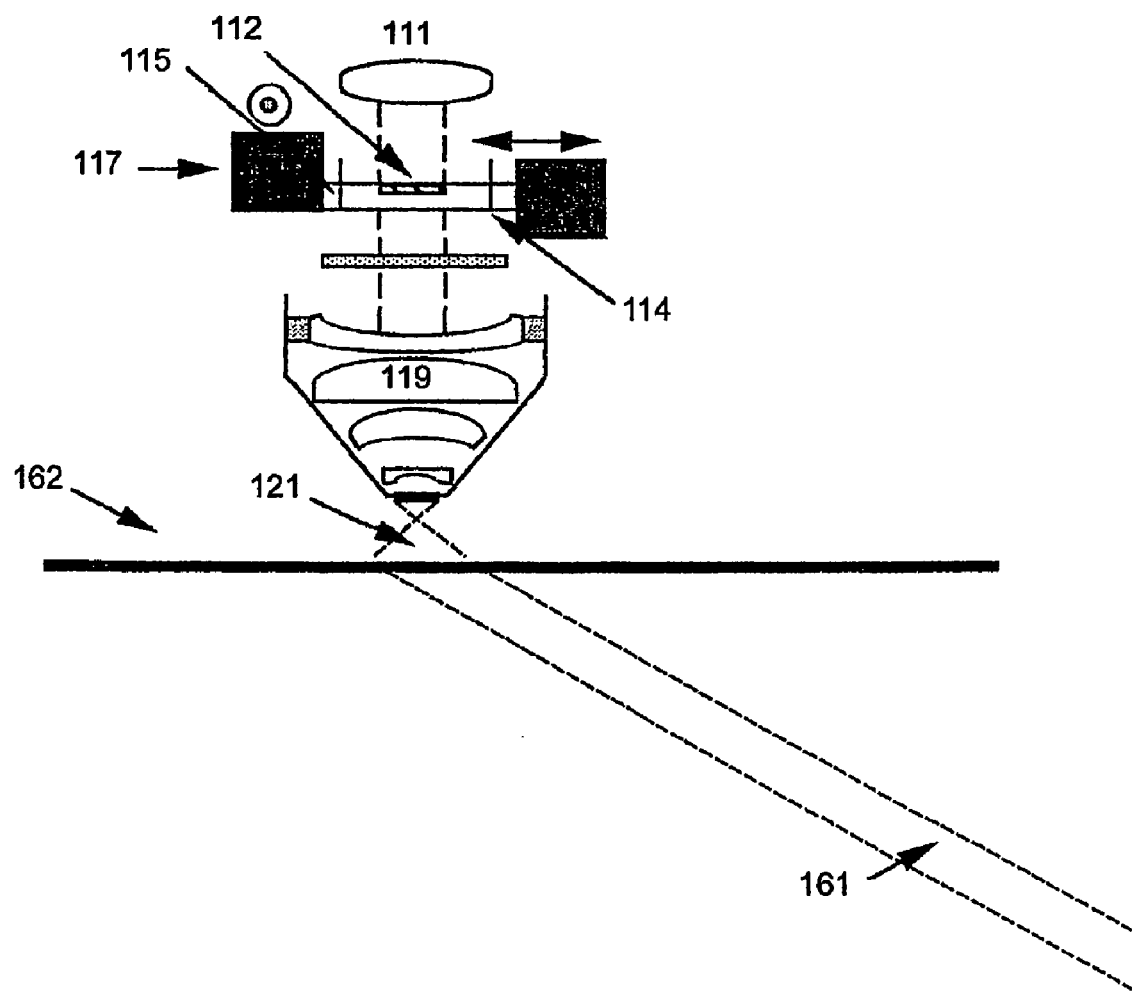
FIG. 4 shows the known holographic printer working in an H1 master hologram writing mode for the case of a reflection H1 hologram.
Figure 5:
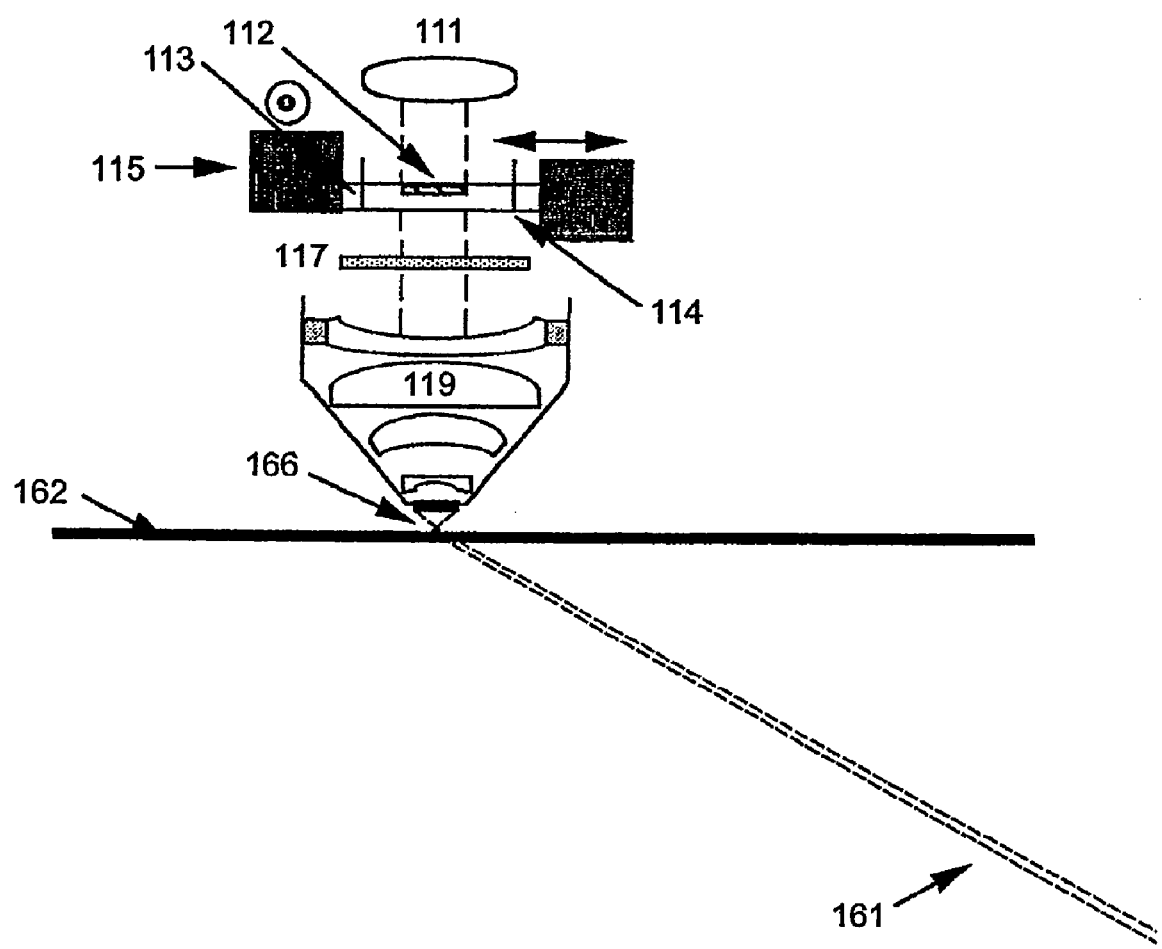
FIG. 5 shows the known holographic printer working in a direct (or 1-step) writing mode for the case of a reflection hologram.
Figure 6:
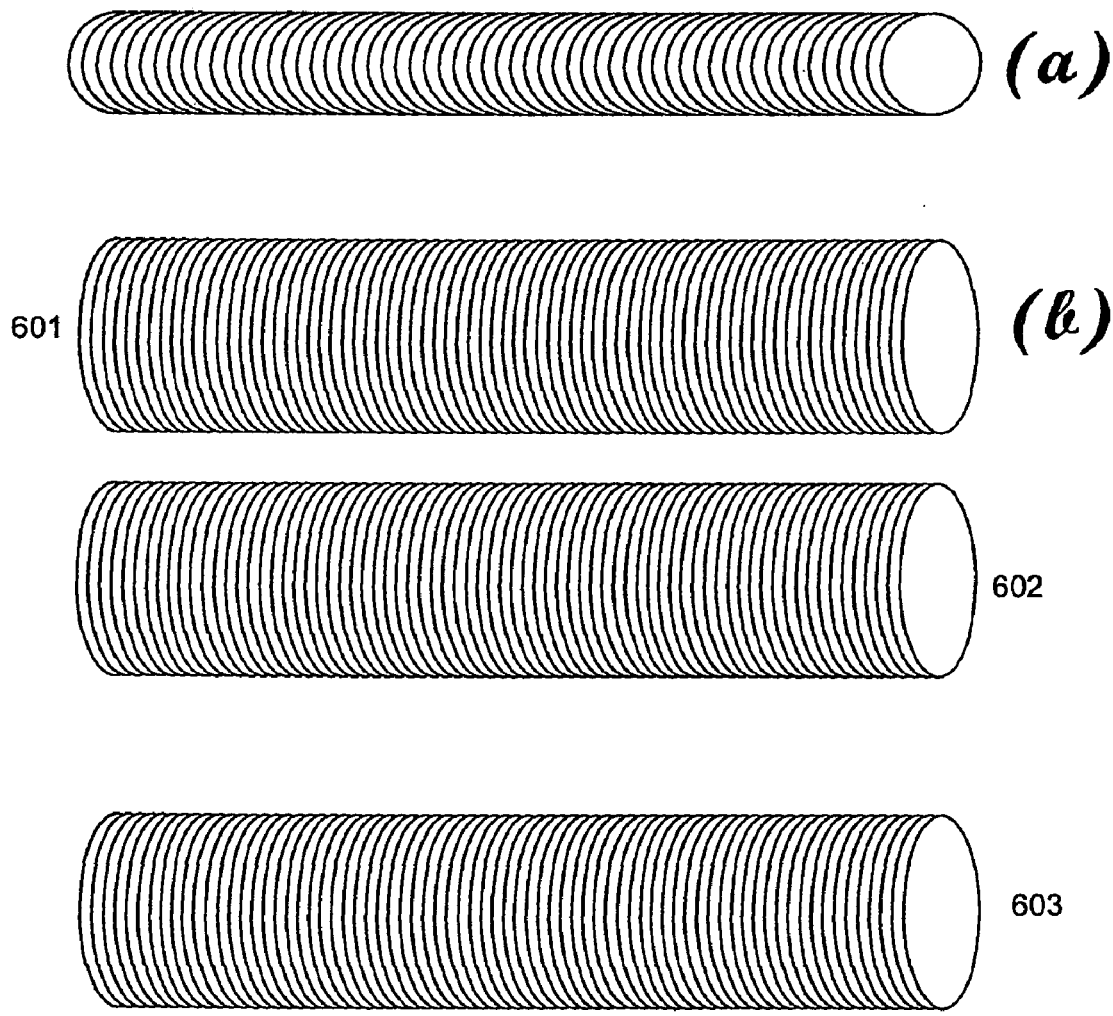
Figure 7:
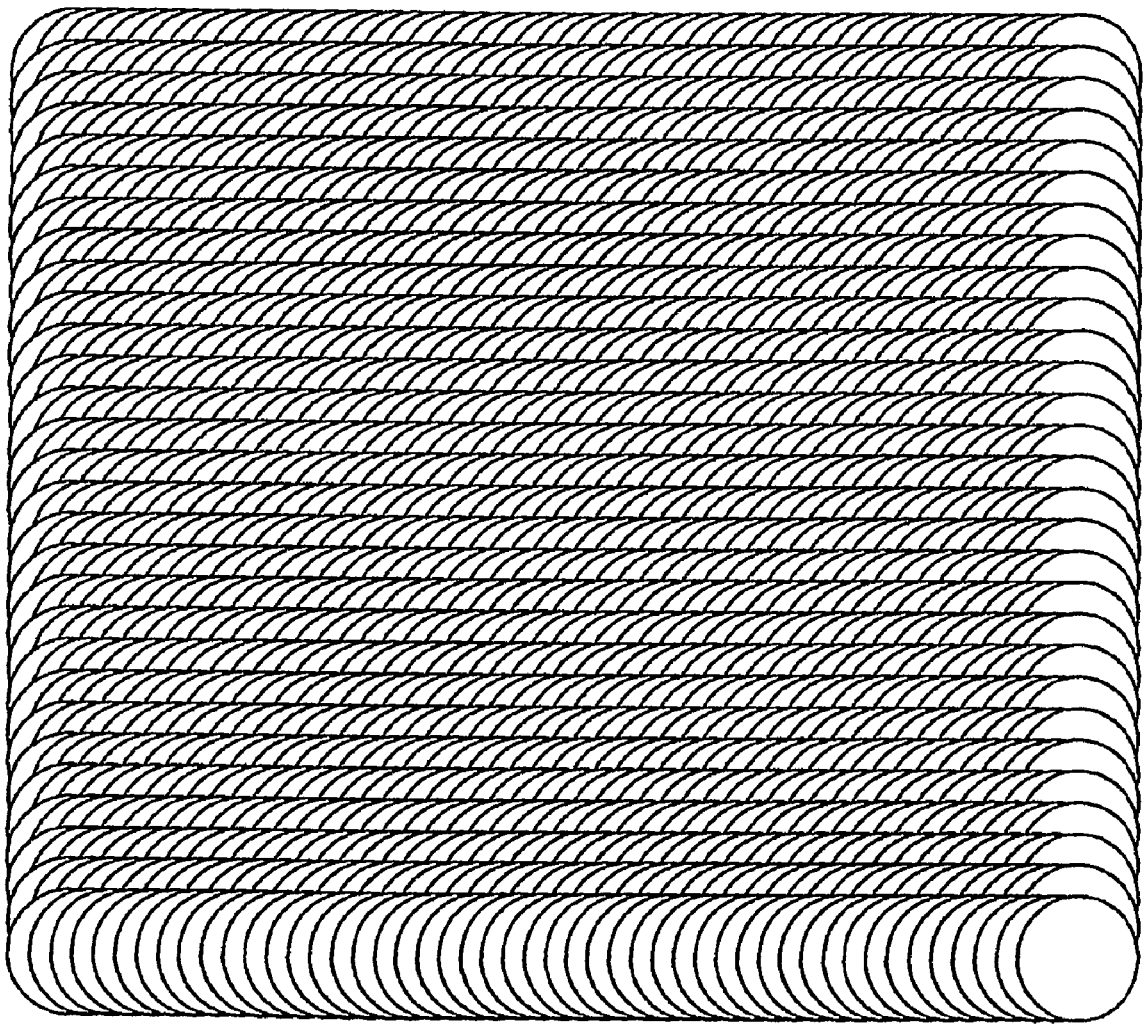
Figure 8:
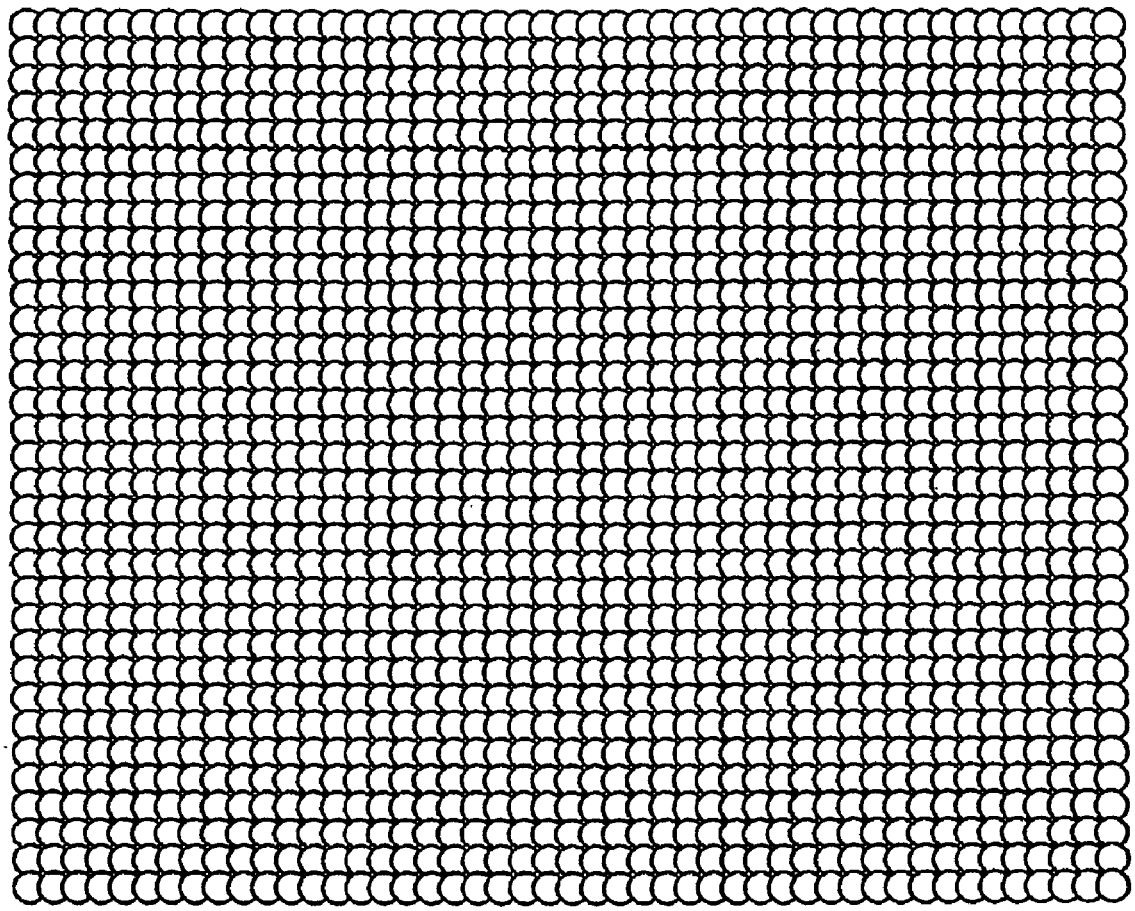
Figure 9:
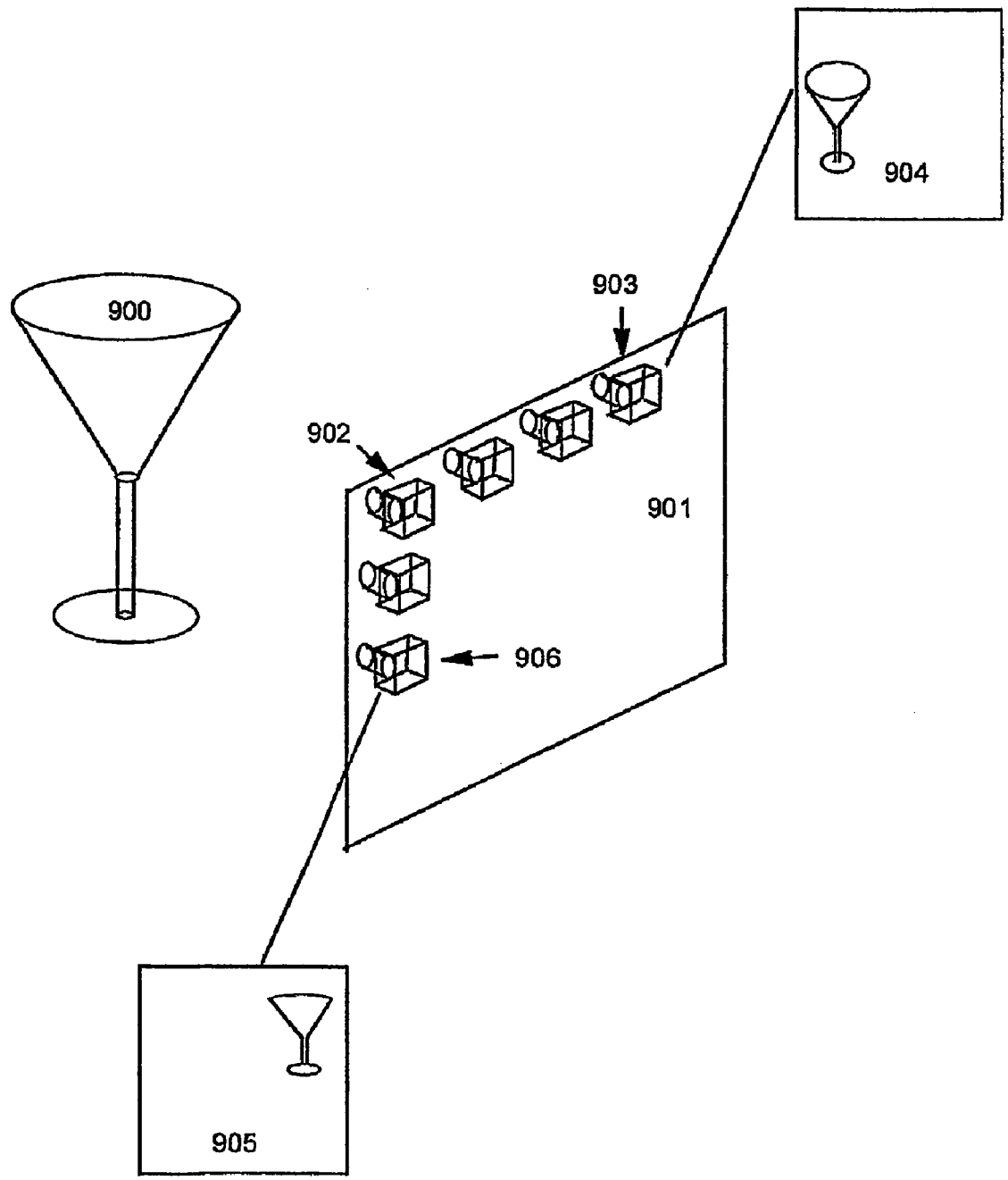
Figure 10:
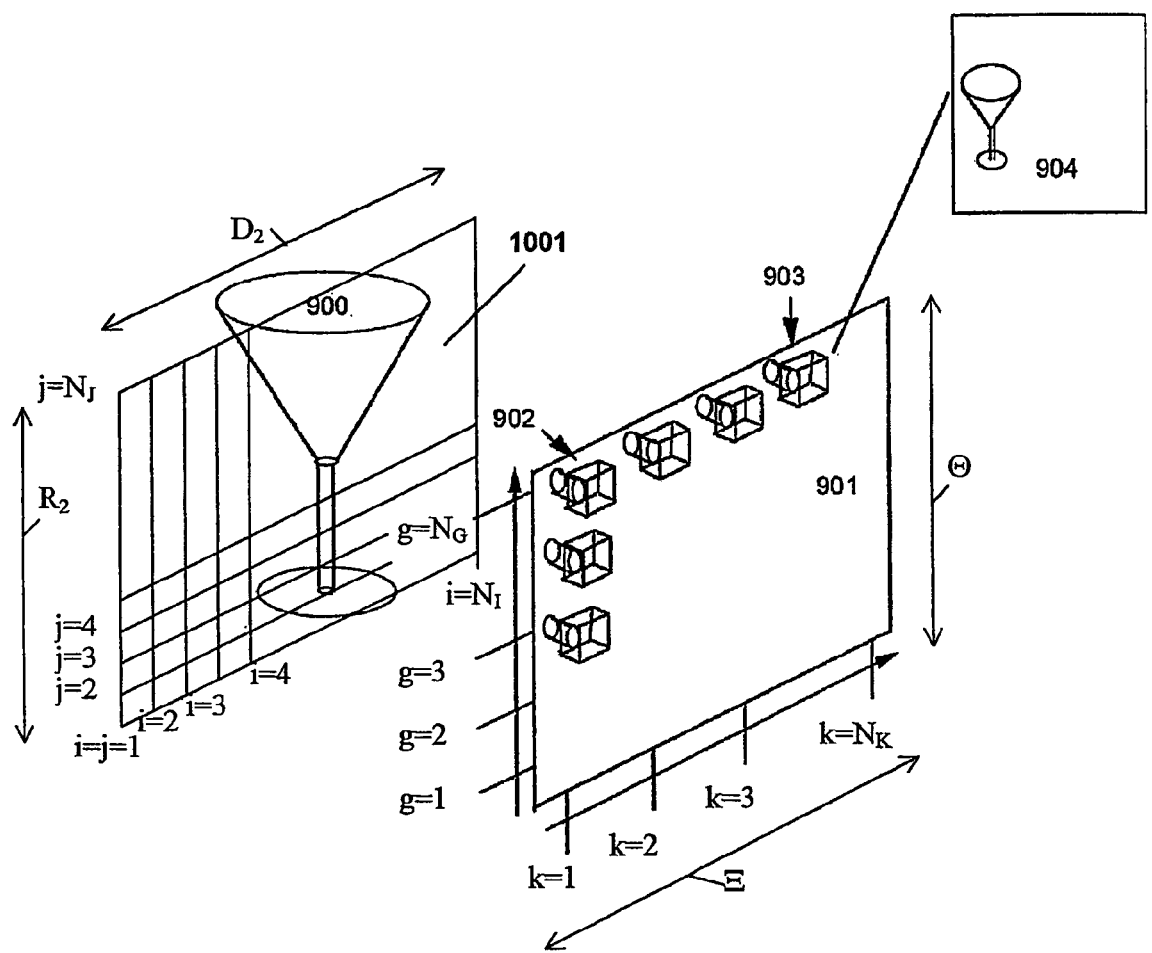
Figure 11:
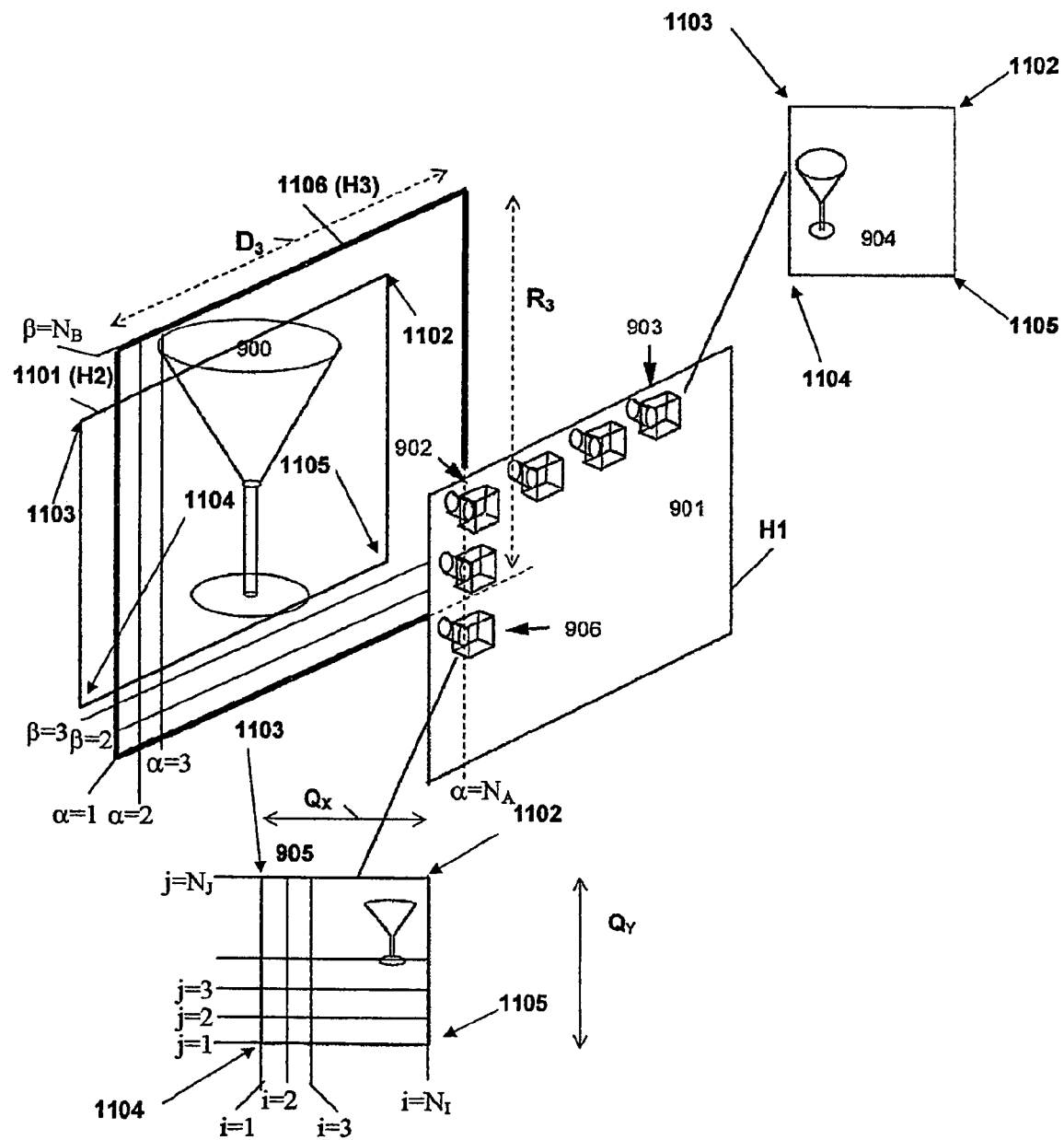
Figure 12:
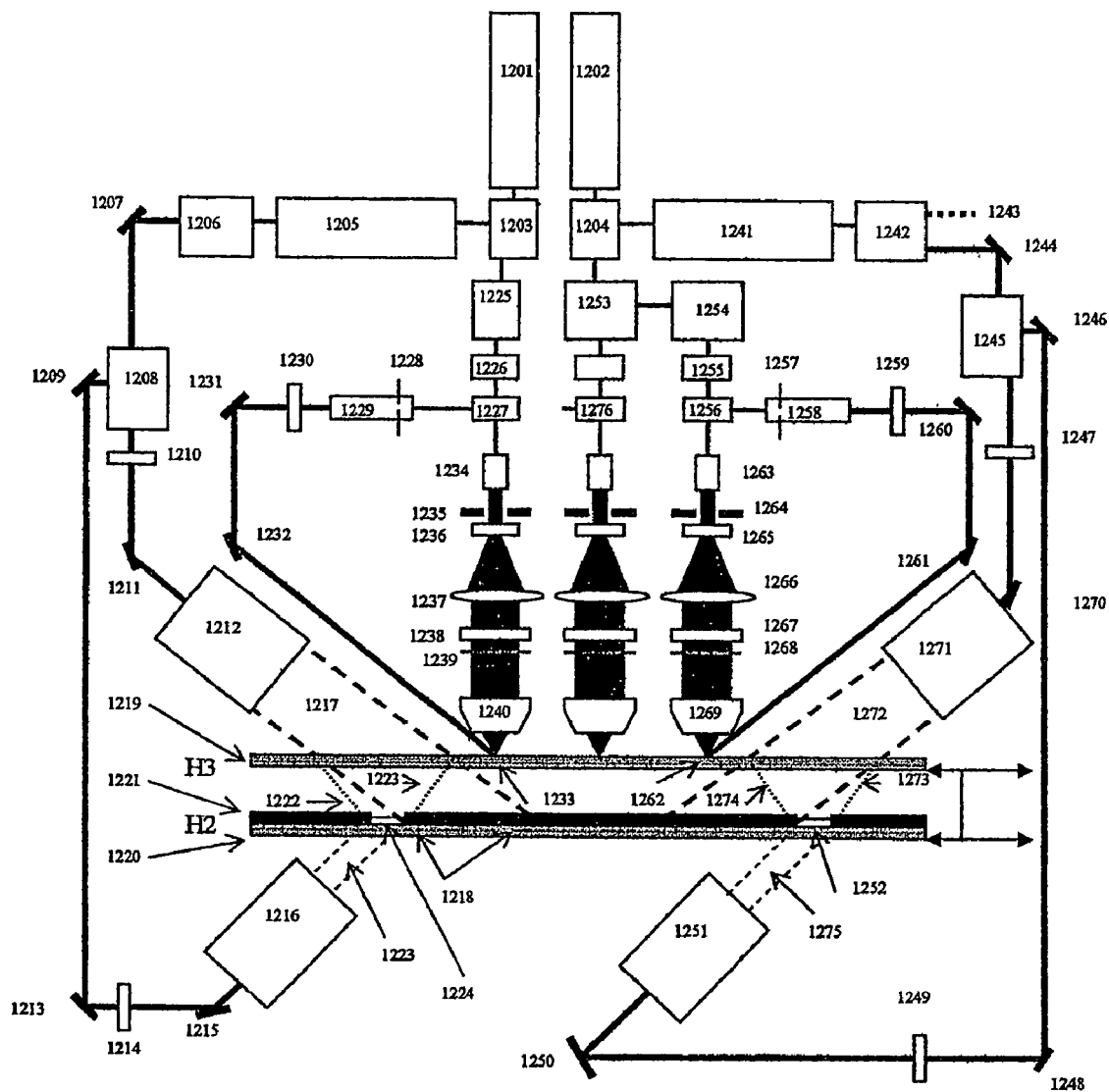
Figure 13A:
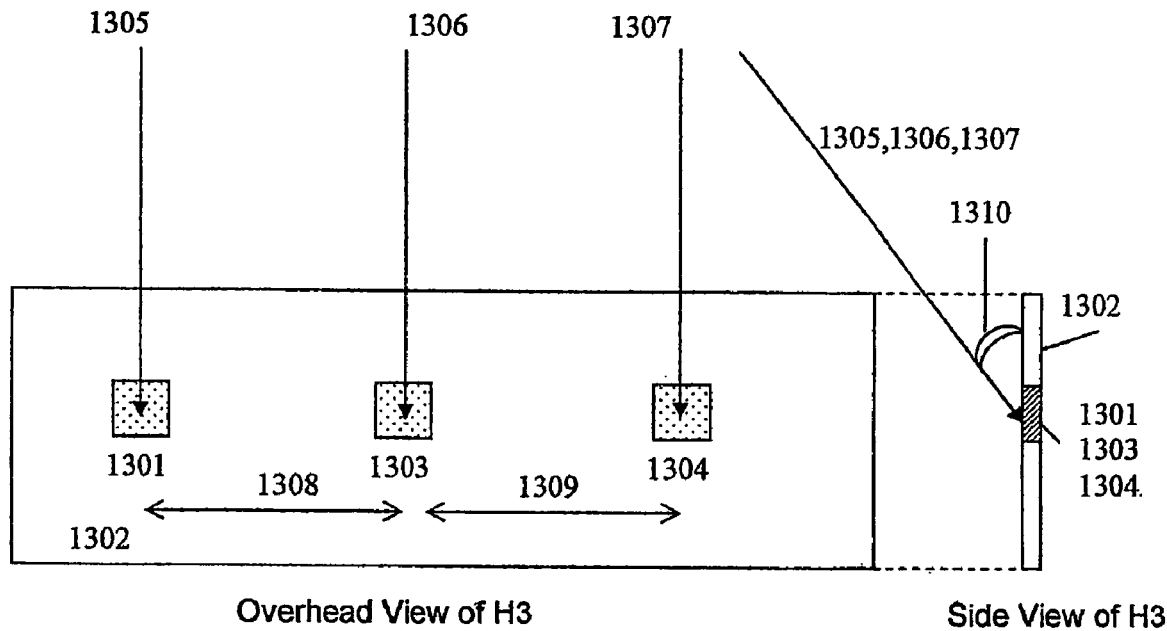
Figure 13B:
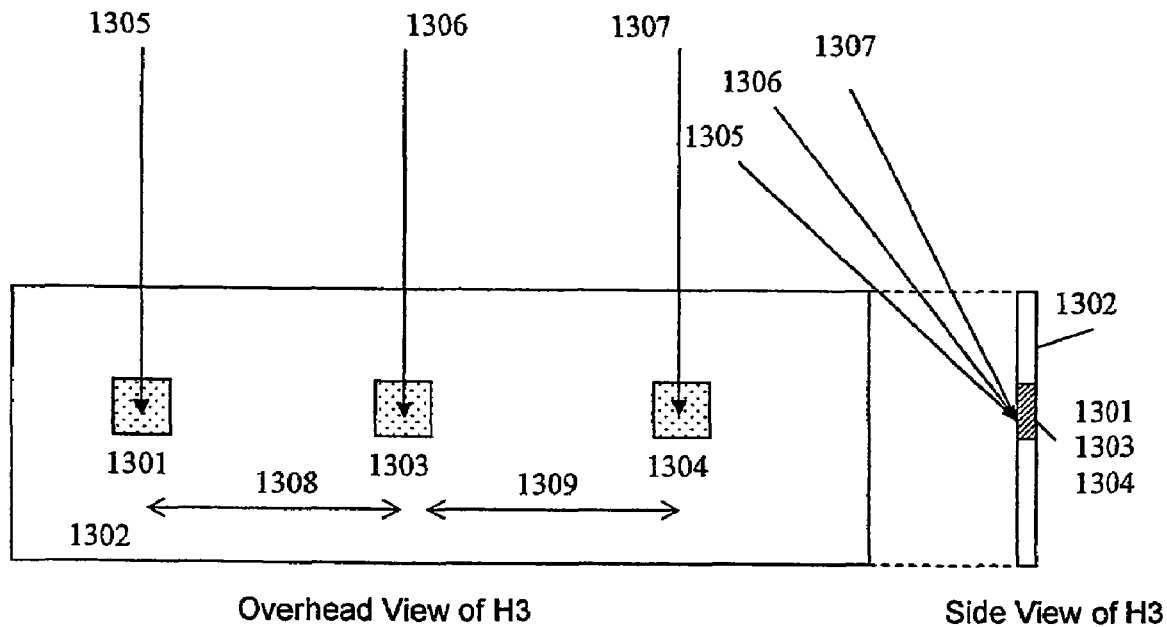
Figure 13C:
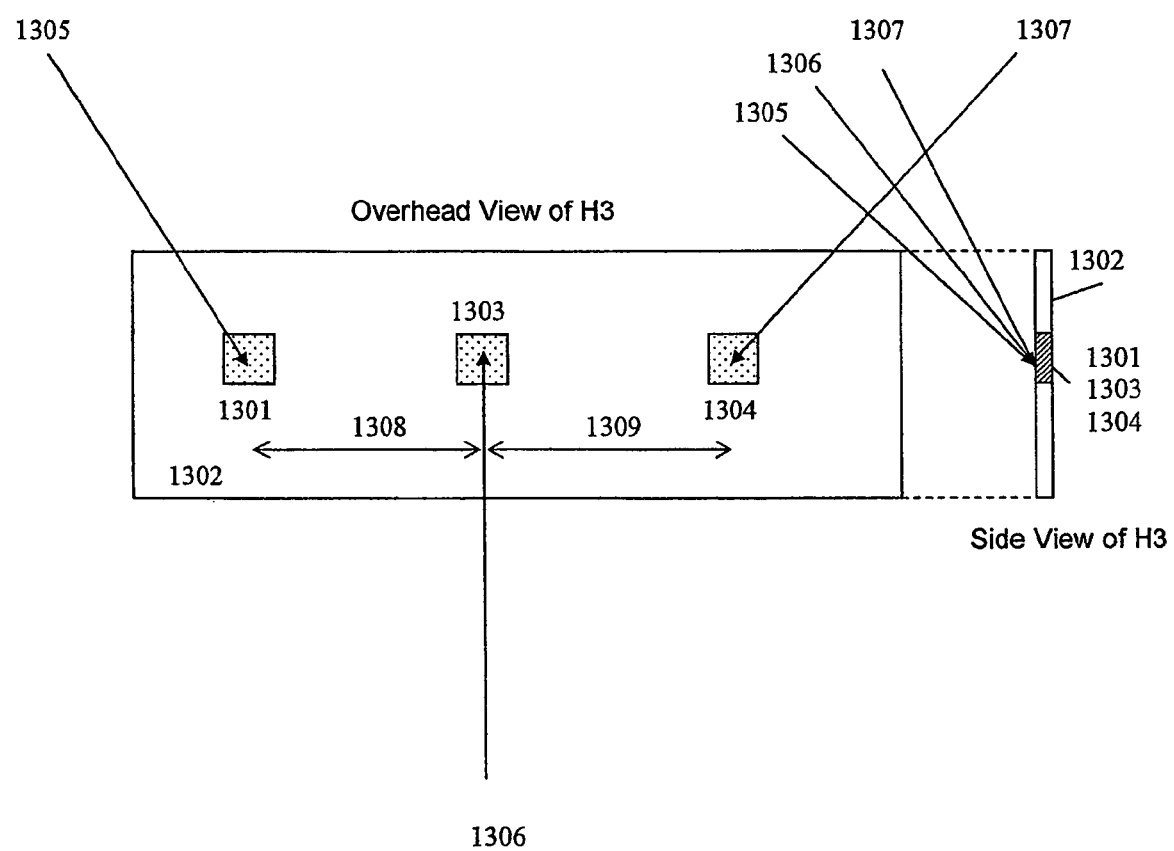
Figure 14:
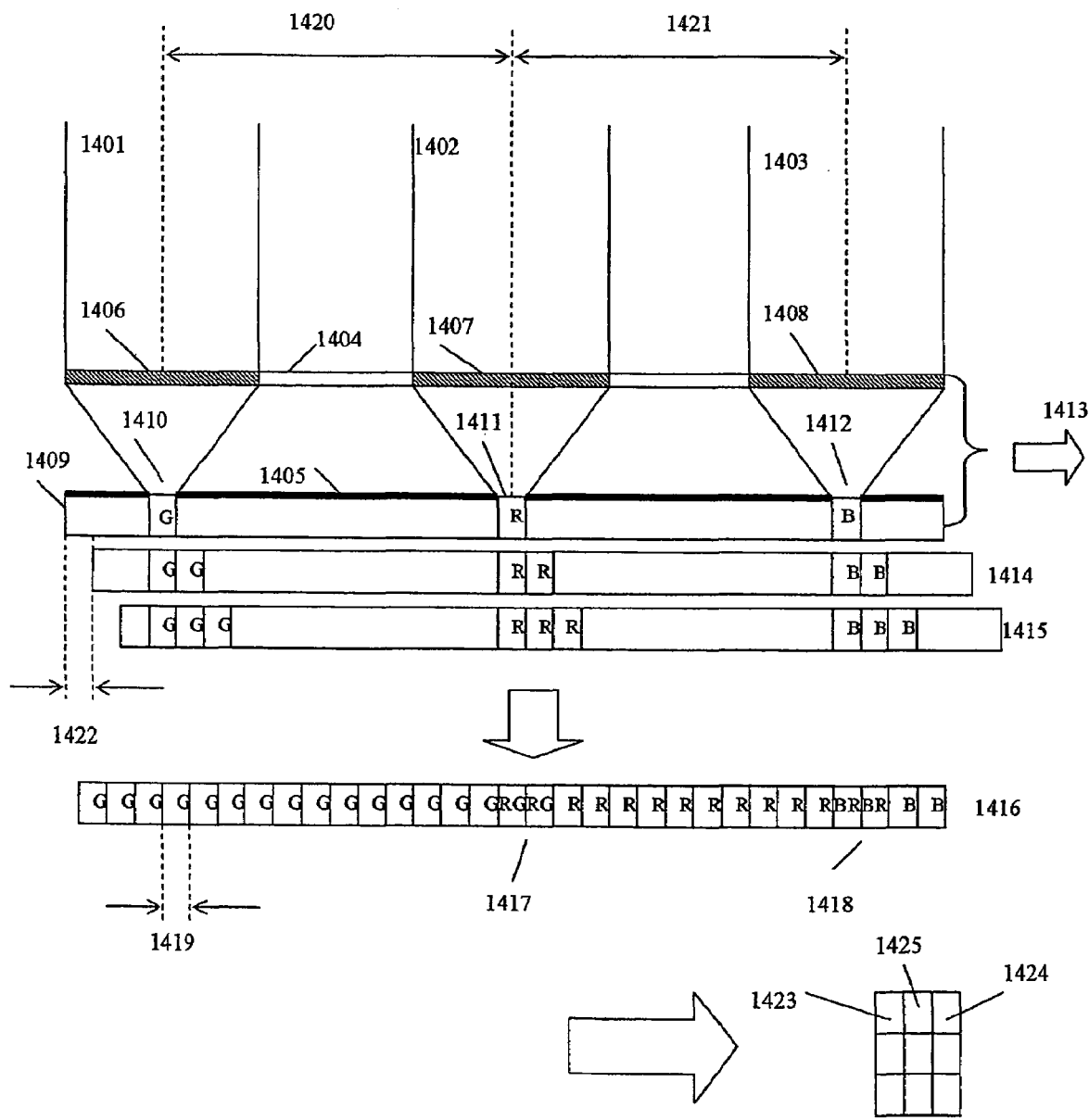
Figure 15:
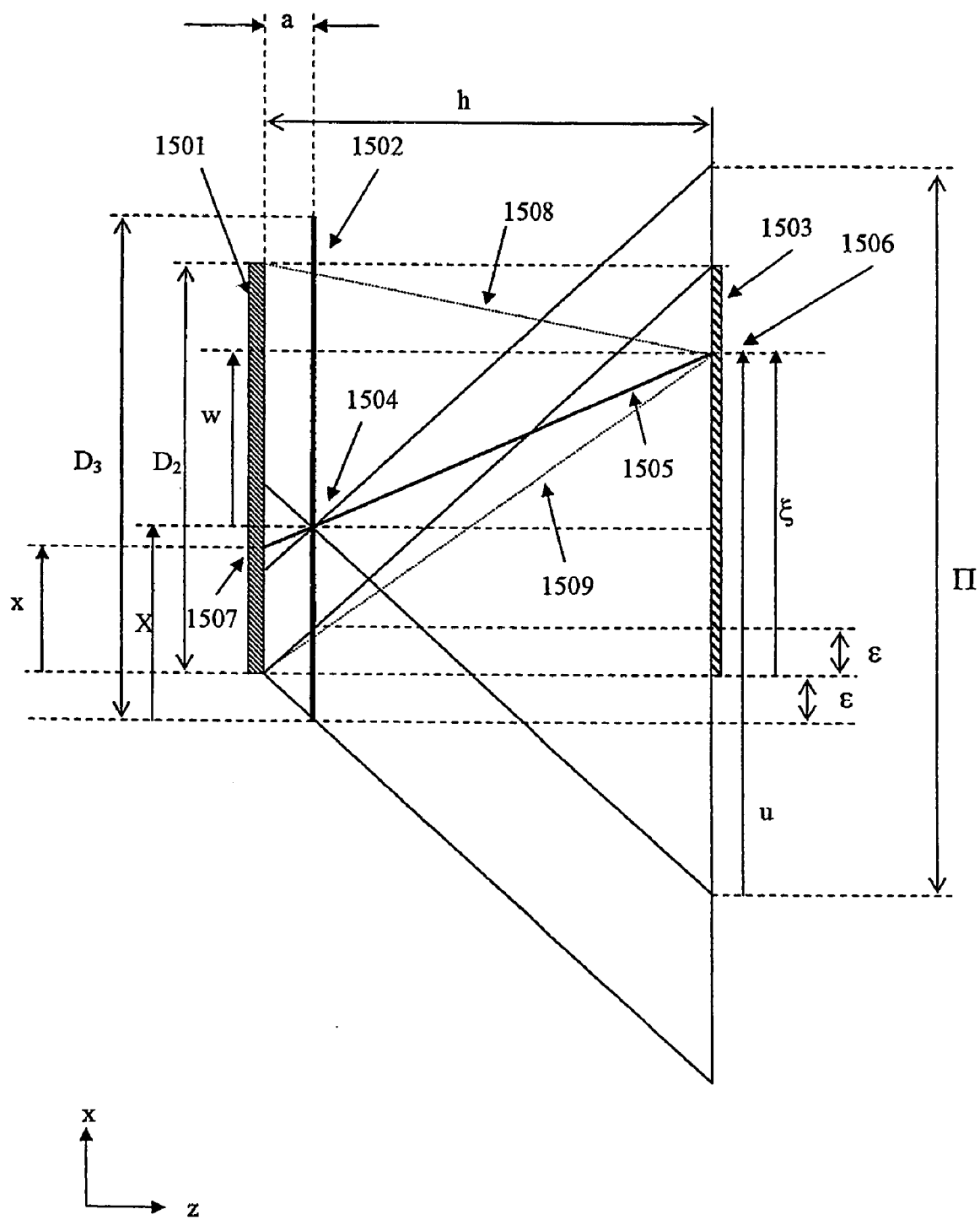
Figure 16:
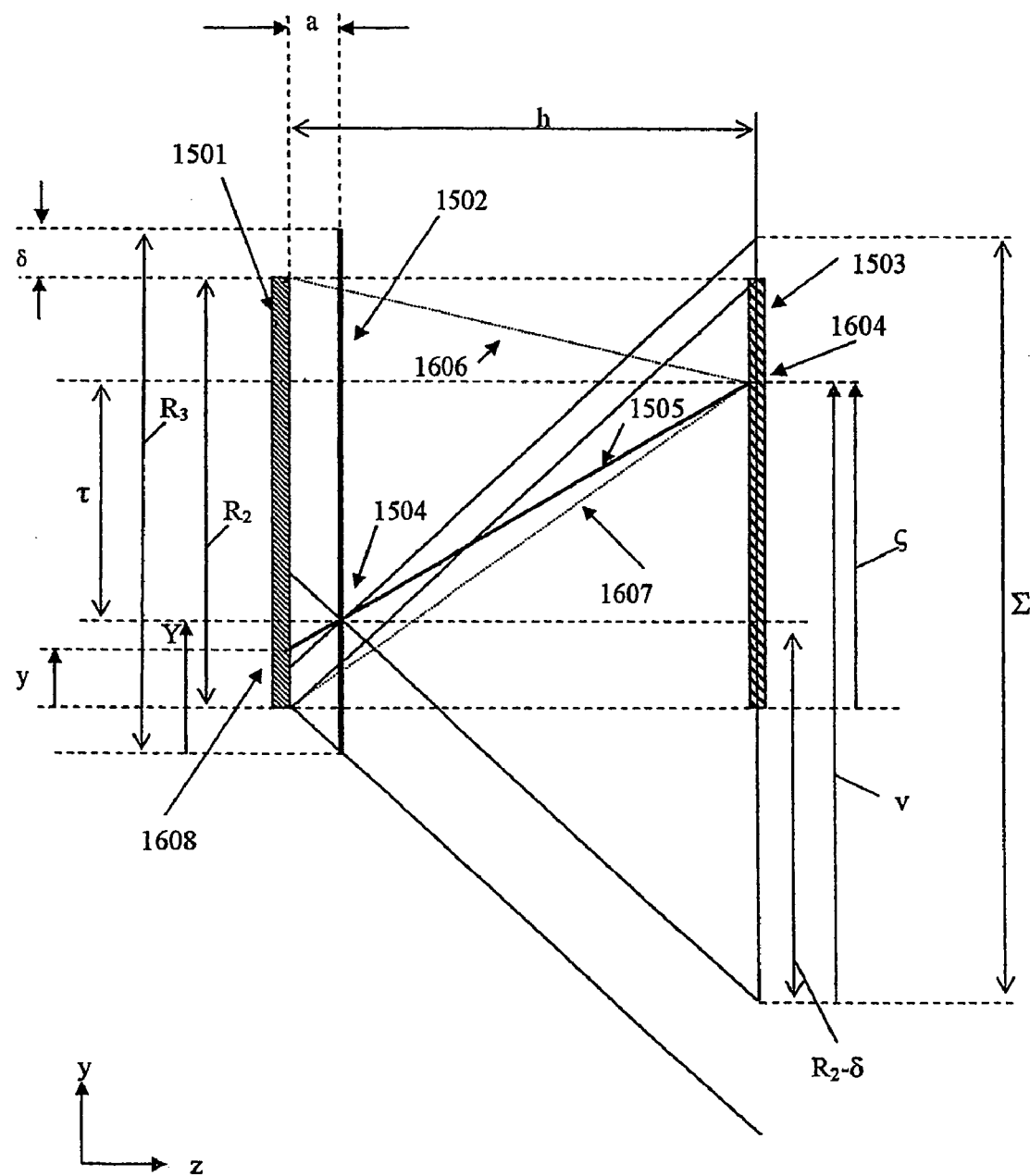
Figure 17:
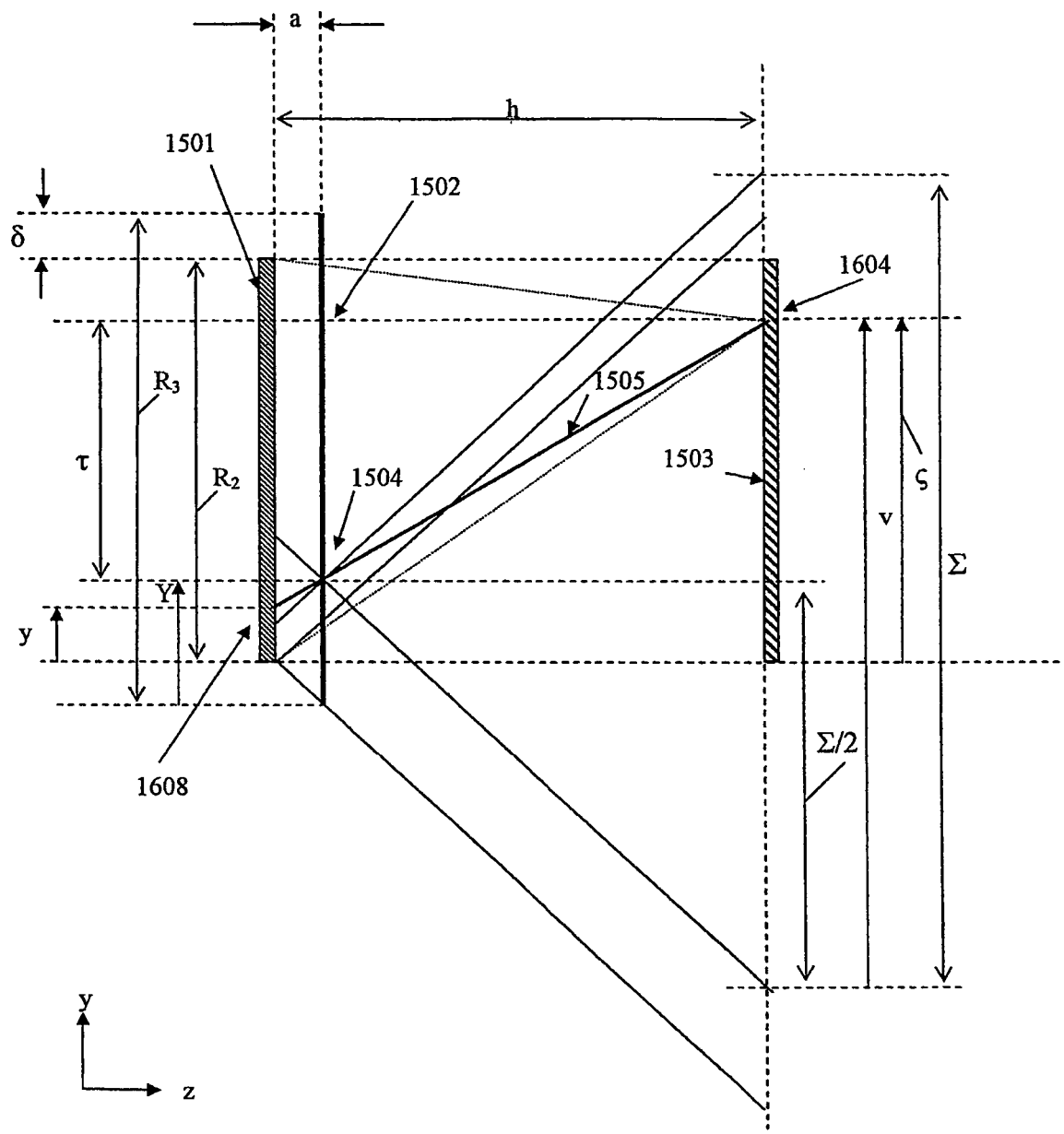
Figure 18A:
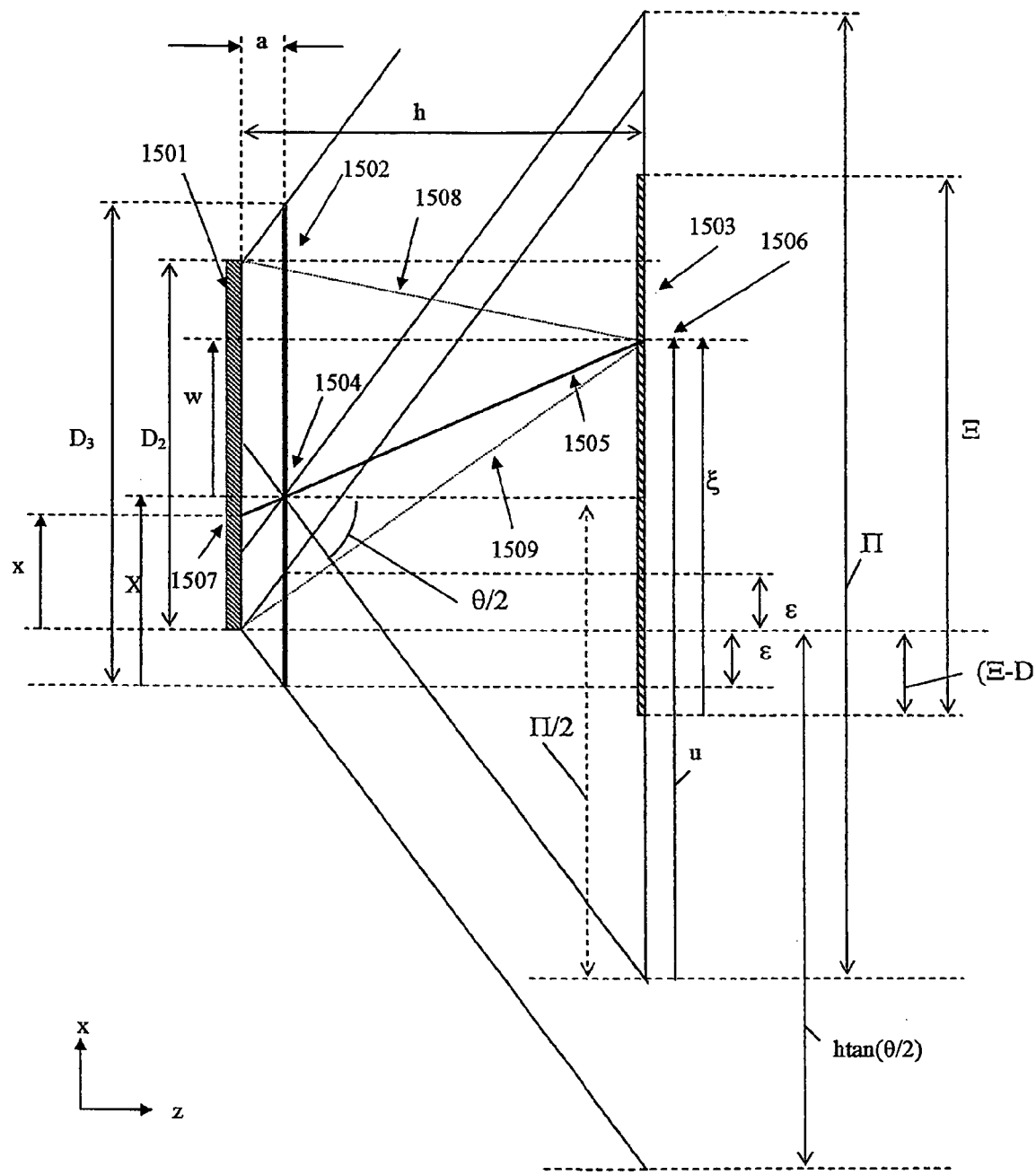
Figure 18B:
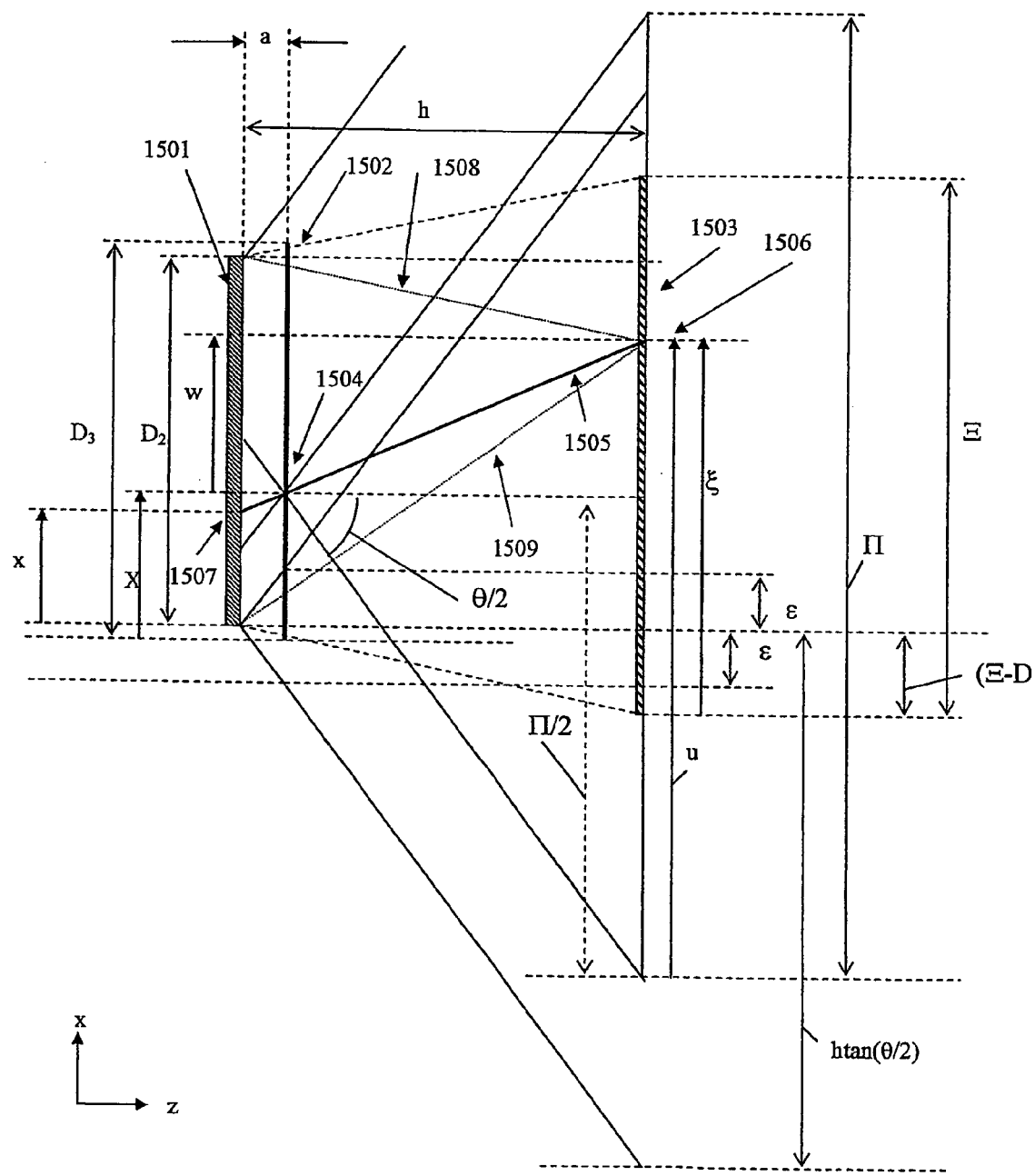
Figure 19A:
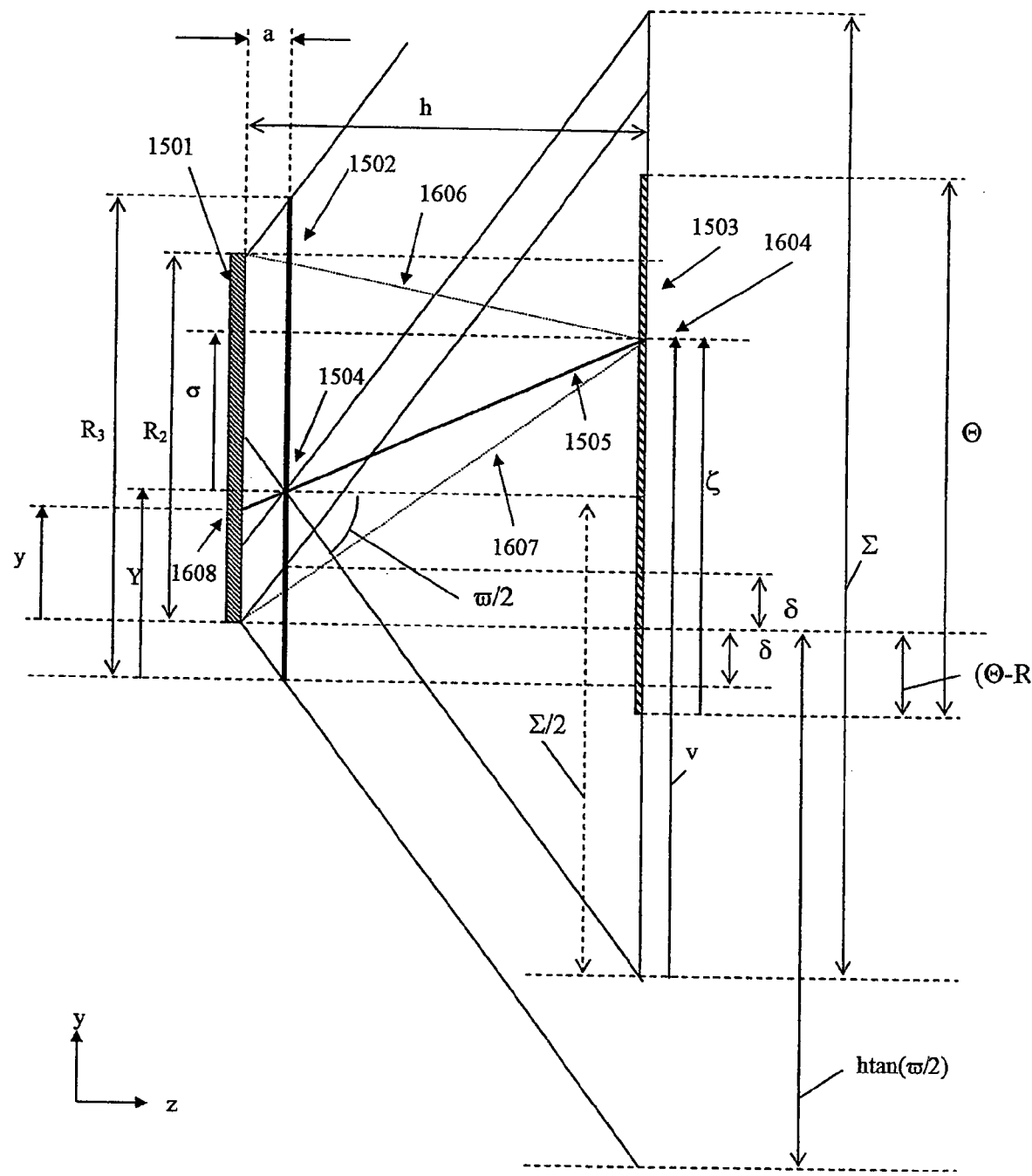
Figure 19B:
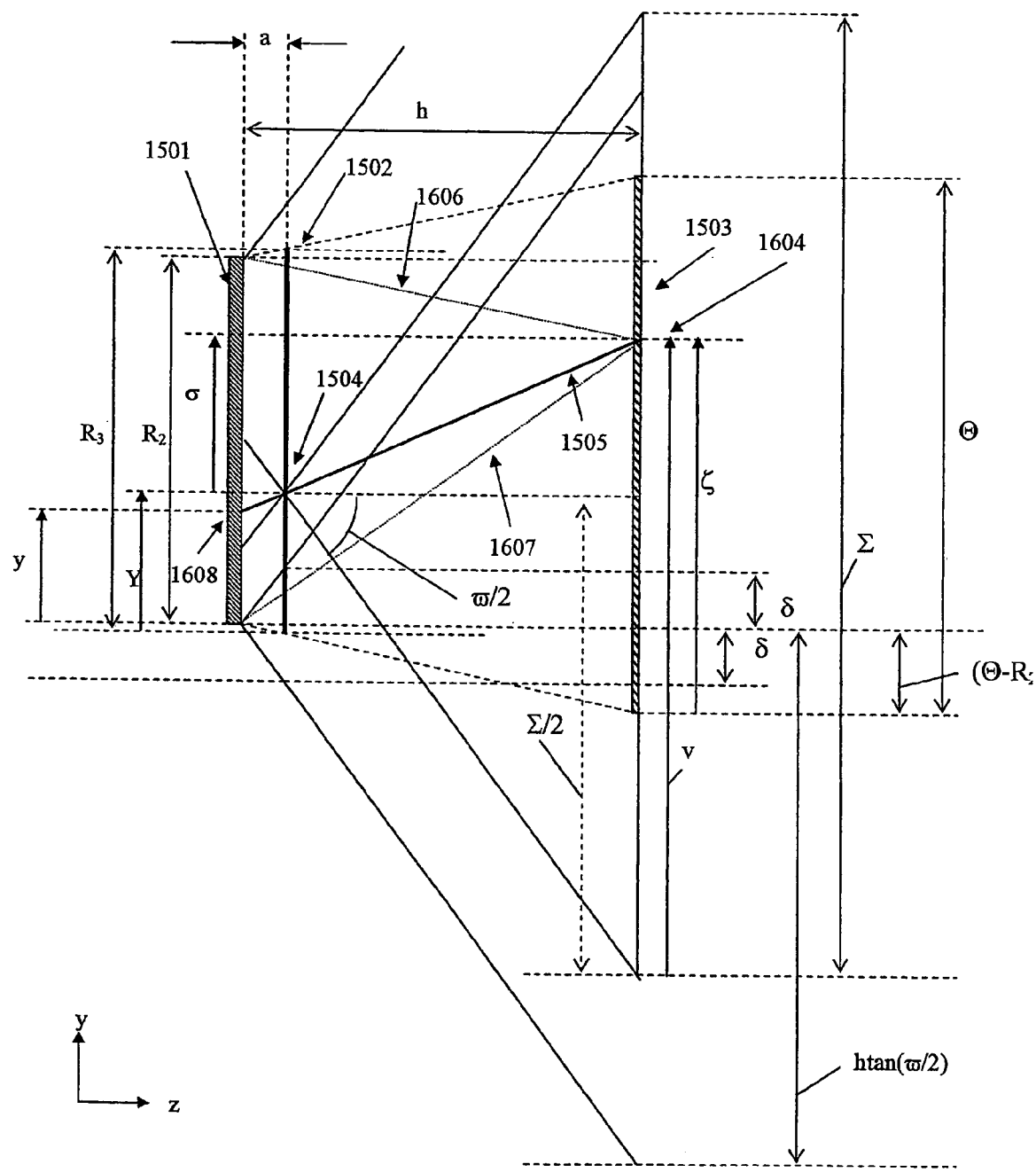
Figure 20:
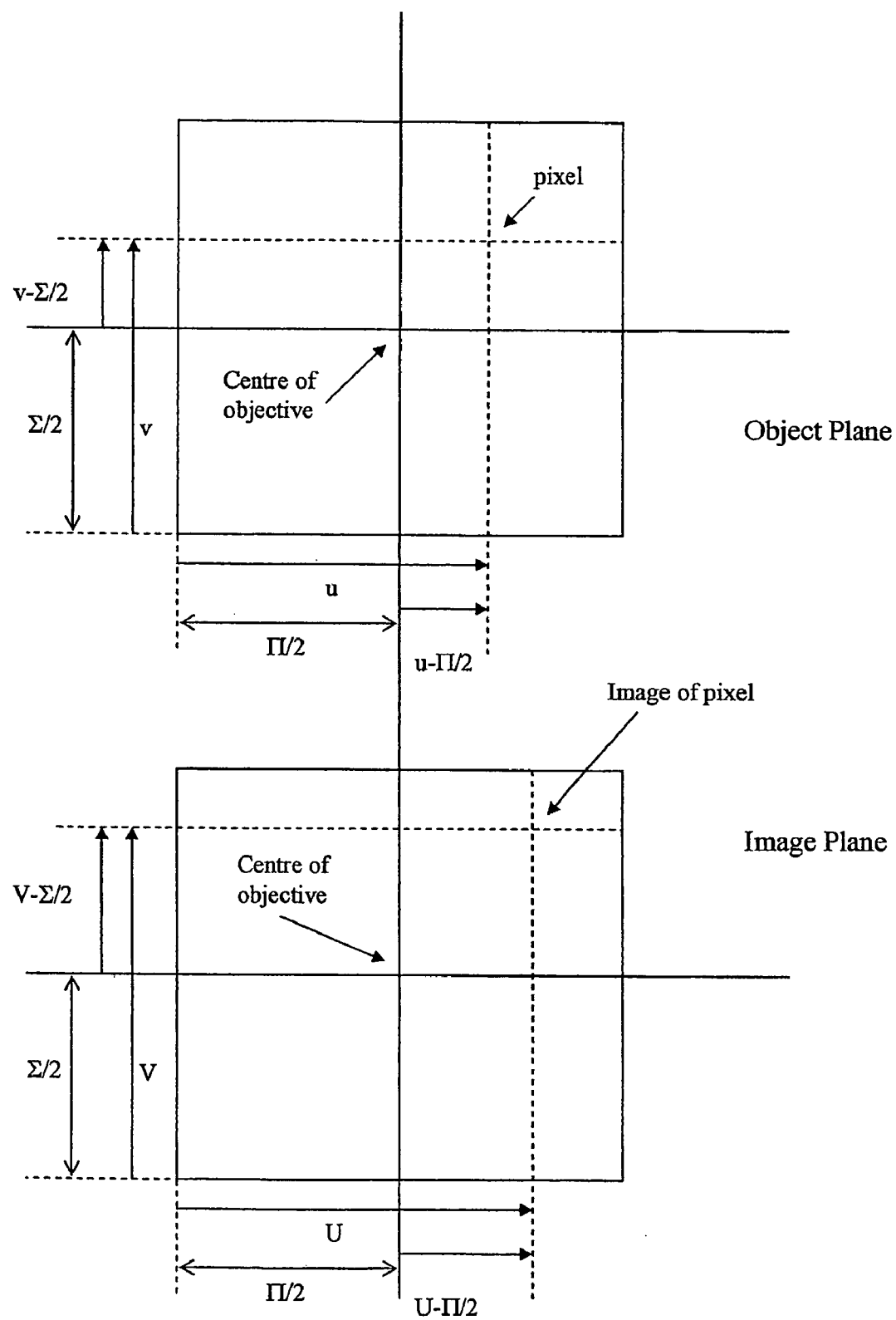

FIG. 6(a) shows for the case of the known holographic printer the overlapping object beam density pattern recorded on the holographic material typical of an H1 master hologram written for the creation of a rainbow hologram by conventional transfer with each circle containing the perspective information for a certain viewpoint and FIG. 6(b) shows for the case of the known holographic printer the overlapping object beam density pattern recorded on the holographic material typical of an H1 master hologram written for the creation of a full-colour rainbow hologram by conventional transfer with each ellipse containing the perspective information for a certain viewpoint, the three rows representing the three primary colour separations;

FIG. 7 shows for the case of the known holographic printer the overlapping object beam density pattern recorded on the holographic material typical of an H1 full aperture master hologram written for the creation of a mono or full colour reflection hologram by conventional transfer with each circle containing the perspective information from a certain point in space as shown in FIG. 9;

FIG. 8 shows for the case of the known holographic printer the object beam density pattern recorded on the holographic material typical of a directly written (1-step) hologram with each circle containing the directional and amplitude information of light originating from that point that constitutes the 3-D image;

FIG. 9 shows the process of acquiring data from a series of sequential camera shots that can be used to generate the holograms and also represents a computer model of an object where a viewing plane is defined on which perspective views are generated;

FIG. 10 shows the mathematical discretization of the camera tracking plane and the hologram plane;

FIG. 11 shows the mathematical discretization of the camera photo frame and the H3 hologram plane;

FIG. 12 shows a plan view of a preferred embodiment (H3 shown here from side);

FIG. 13(a) shows overhead and side views of the H3 hologram illustrating various reference beam geometries used for the writing of said H3 hologram wherein identical azimuthal and altitudinal angles of reference are used, FIG. 13(b) shows corresponding views where differing altitudinal angles but identical azimuthal angles are used and FIG. 13(c) shows corresponding views where widely differing azimuthal angles are used;

FIG. 14 shows a section through the H3 and H2 planes viewed from the side during H3:H2 transfer showing how individual H2 super-pixels are built up and overlapped;

FIG. 15 shows an overhead view of the H2 (1501), H3 (1502) and camera/viewing planes (1503) for the case of a viewing window of the same horizontal dimensions as the H2 hologram;

FIG. 16 shows a side view of the H2 (1501), H3 (1502) and camera/viewing planes (1503) for the case of LCD aspect ratio equaling the H2 aspect ratio and for the case of a viewing window of the same vertical and horizontal dimensions as the H2 hologram;

FIG. 17 shows a side view of the H2 (1501), H3 (1502) and camera/viewing planes (1503) for the case of a viewing window of the same vertical and horizontal dimensions as the H2 hologram and for the general case of the LCD aspect ratio not equaling the H2 aspect ratio;

FIG. 18(a) shows an overhead view of the H2 (1501), H3 (1502) and camera/viewing planes (1503) for the case of a general sized viewing window and FIG. 18(b) shows an overhead view of the H2 (1501), H3 (1502) and camera/viewing planes (1503) for the case of a general sized viewing window and an alternative H3 geometry;

FIG. 19(a) shows a side view of the H2 (1501), H3 (1502) and camera/viewing planes (1503) for the case of a general sized viewing window and FIG. 19(b) shows an side view of the H2 (1501), H3 (1502) and camera/viewing planes (1503) for the case of a general sized viewing window and an alternative H3 geometry; and FIG. 20 shows the normalized object and image planes of a hologram writing objective having finite distortion.

A preferred embodiment will now be described in more detail and with reference to FIG. 12 which shows a plan view of a preferred holographic printer. The device has two basic modes of operation. The first mode allows the recording of an H3 intermediate (or master) hologram from digital data. The second mode allows the transfer of this H3 hologram to a conventional H2 hologram. The multiple colour pulsed laser used in this embodiment is described in more detail in WO02/29487.

H3 Generation Mode

A Neodymium YAG ring oscillator 1201 is used to generate a train of single frequency 50 ns laser pulses at 1064 nm in TEM00 mode at around 20 Hz. When functioning in H3 generation mode the automated beamsplitter switch 1203 is used to switch the radiation produced by 1201 directly into the element 1225. In H3:H2 transfer mode the switch 1203 transfers the radiation produced in 1201 into element 1205.

The radiation at 1064 nm is now converted to 532 nm by the harmonic doubling element 1225. Thereafter the variable automated attenuator 1226 is used to control the energy of the radiation. The automated variable beamsplitter 1227 is now used to split the radiation at 532 nm into an object and reference beam. The reference path comprises an automated variable telescope 1229 (incorporating automated aperture 1228 for reference-beam footprint control), compensating lens 1230 and transfer mirrors 1231 and 1232. These elements allow the size and shape of the reference beam at the position 1233 to be controlled and matched to the size and shape of the object beam.

The 532 nm object beam is formed initially by the variable automated beam expander/collimator 1234 and iris 1235. Thereafter the collimated beam, now of a variably controlled size, illuminates a microlens array 1236. The expanded radiation is then recollimated by the lens 1237 (whose focal length is chosen to be equal to the distance between the elements 1236 and 1237) before illuminating the Liquid crystal display unit (LCD) 1238 onto which specially transformed digital data is displayed.

The radiation transmitted by the LCD 1238 passes through a polarizer 1239 in order to transform the digital data into an amplitude modulation of the LCD illuminating radiation. The radiation is thereafter passed through a wide-angle objective 1240. The object beam is then finally brought to an approximate focus at the position 1233 on the photosensitive material, coincident with the reference beam and where interference between the object and reference beams creates a green holographic pixel.

The photosensitive medium 1219 is moved in a plane normal to the propagation vector of the axial ray of the object beam in such a way as to record neighbouring green pixels evenly (or unevenly) over a 2-dimensional grid. As mentioned above, the laser oscillator flashes at around 20 Hz. At each flash a green pixel is thus written and the material 1219 is then advanced in one direction by a fixed amount. The digital data feeding the green LCD 1238 is then updated and another green pixel is written. When one line of pixels has been terminated the photosensitive material is moved in a direction orthogonal to the previous linear motion and another line of green pixels is commenced parallel to the previous line. This process continues until a 2-dimensional area of the material 1219 has been covered with holographic pixels.

Since the material 1219 can have significant inertia and further since the pulse repetition rate of the laser oscillator is relatively high the material 1219 is moved electromechanically either at a constant velocity (case of evenly spaced pixels) or using a programmed velocity curve (case of changing space between pixels). In both cases the laser flash and LCD update are synchronized to the photosensitive material position and errors corrected by continual adjustment of the laser flash rate.

Single frequency TEM00 50 ns red and blue laser pulses are generated respectively by doubling and tripling of fundamental radiation at 1319 nm produced by the ring Neodymium YAG laser oscillator 1202. This oscillator works at 20 Hz and is synchronized to 1201. When functioning in H3 generation mode the automated beamsplitter switch 1204 is used to switch the radiation produced by 1202 directly into the element 1253. In H3:H2 transfer mode the switch 1204 transfers the radiation produced in 1201 into element 1241.

Element 1253 converts radiation at 1319 nm into harmonically doubled radiation at 659 nm and further transmits a part of the 1319 nm to the tripling unit 1254 which in turn produces radiation at 440 nm. The red and blue channels are now treated in exactly the same way as described in relation to the green channel.

Thus the variable automated attenuator 1255 is used to control the energy of the blue radiation. The automated variable beamsplitter 1256 is now used to split the radiation at 440 nm into an object and reference beam. The reference path comprises an automated variable telescope 1258 (incorporating automated aperture 1257 for reference-beam footprint control), compensating lens 1259 and transfer mirrors 1260 and 1261. These elements allow the size and shape of the reference beam at the position 1262 to be controlled and matched to the size and shape of the object beam.

The 440 nm object beam is formed initially by the variable automated beam expander/collimator 1263 and iris 1264. Thereafter the collimated beam, now of a variably controlled size, illuminates a microlens array 1265. The expanded radiation is then recollimated by the lens 1266 (whose focal length is chosen to be equal to the distance between the elements 1265 and 1266) before illuminating the LCD 1267 onto which specially transformed digital data for the blue channel is displayed.

The radiation transmitted by the LCD 1267 passes through a polarizer 1268 in order to transform the blue digital data into an amplitude modulation of the blue LCD illuminating radiation. The radiation is thereafter passed through an objective 1269 that is described in more detail in WO01/45943 (modified here for operation at 440 nm). The blue object beam is then finally brought to an approximate focus at the position 1262 on the photosensitive material, coincident with the blue reference beam and where interference between these object and reference beams creates a blue holographic pixel.

The red object and reference beams are formed in a manner identical to the blue and green beams. For clarity purposes only the red reference beam circuit has been omitted from FIG. 12.

Preferably, the distance between the red, green and blue pixel writing locations (1308 & 1309 in FIG. 13) is an integer multiple of the incremental photosensitive material advance distance between flashes such that different colour pixels can either (i) be precisely overlapped or (ii) remain strictly adjacent to partner colours.

The H3 hologram is a panchromatic composite transmission hologram. In one embodiment (FIG. 13(*a*)) each colour channel is recorded (using a relatively thin emulsion layer) at the same altitudinal (approx Brewster's angle) and azimuthal (±180°) reference beam angles. A section of the H3 holographic plate (1302) is shown from above on the left-hand side of the diagram and from the side on the right-hand side of the diagram. Green (1301), Red (1303) and Blue (1304) holographic pixels are written using the reference beams 1305, 1306 and 1307 which all make the altitudinal angle 1310 to the H3 plane.

In another embodiment (FIG. 13(*b*)) each colour channel is recorded (using a rather thicker emulsion layer) at somewhat different altitudinal angles but at the same azimuthal (±180°) reference beam angle.

Less preferably, in yet another embodiment the azimuthal angles of each chromatic reference beam are chosen to be widely separated (FIG. 13(*c*)).

Note that FIG. 12 illustrates the first alternative discussed above where identical altitudinal and azimuthal (±180°) angles of reference for the green and blue channels are shown. The red channel reference is not shown for reasons of diagrammatic clarity but would mimic either the blue or green. The distances 1308 and 1309 in FIG. 13 are preferably chosen to be the same although according to less preferred embodiments they could be different. Holographic pixels 1301, 1303 and 1304 are preferably arranged to be in a straight line but less preferred embodiments are contemplated wherein they are not arranged in a straight line.

H3:H2 Transfer Mode

This mode is used to write a conventional H2 hologram using an intermediate H3 hologram. The H3 hologram is written as described above and subsequently processed either chemically, thermally or optically depending on the particular photosensitive material used. The completed H3 hologram 1219 is then replaced in its original position in the device.

The laser oscillators 1201 and 1202 function as in the H3 generation mode (20 Hz synchronized operation). However, in the H3:H2 transfer mode the electromechanical beam switches 1203 and 1204 switch the radiation at 1053 nm and 1313 nm to respective amplifier units, 1205 and 1241. These amplifier units take the small energies produced by the laser oscillators 1201 and 1202 (typically around 10–15 mJ) and convert this into an emission of around 5 to 10 times higher which is then harmonically converted by the units 1242 and 1206 into respectively emissions in the red (659 nm) and blue (440 nm) and an emission in the green (532 nm). For clarity, as in the case of the H3 generation mode the red channel (1243) is not shown in FIG. 12 as this channel is similar to the blue and green channels. Since each colour channel functions similarly, only the green channel will be described in detail.

The green laser radiation produced by the harmonic converter 1206 is directed by the transfer mirror 1207 to an electromechanically controlled beamsplitter and/or attenuator unit 1208. This optical unit is used to split the beam into an object and reference of controllable ratio and total energy. Elements 1210 and 1214 are λ/2 waveplates that are used to adjust the polarization of both object and reference to the required matched values to ensure both maximum interference and also minimum parasitic reflection from the H3 1219 and the H2 1220. The reference beam is thus transferred by mirror 1209 to mirror 1213, the polarization is then adjusted at 1214 before being transferred again by mirror 1215 to the electromechanically controllable collimator and beam expander unit 1216. This unit is used to control the diameter (and in more advanced applications the footprint shape) of the collimated beam 1223 incident on the photosensitive material 1220.

The object beam polarization is adjusted as previously described by element 1210 after which the beam is directed via mirror 1211 to the electromechanically controllable collimator and beam expander unit 1212. This unit is used to control the diameter (and in more advanced applications the footprint shape) of the collimated beam 1217 that illuminates the H3 1219.

The azimuthal and altitudinal angles of the green reference replay beam 1217 are chosen to match exactly those used at recording. In this way the beam 1217 produces a first order diffracted beam at the zone of illumination of 1219 that faithfully reproduces the original object beam recorded on the H3 at this location. A mask 1221 fixed in very close proximity to the recording material 1220 is used to select a defined portion of the diffracted radiation (delineated by 1222 and 1223) by the aperture 1224 which is located centrally with respect to the illuminated zone of the H3. The shape and size of this aperture is matched (either manually or electromechanically or electro-optically) to the shape and size of the reference beam 1223. In this way a macroscopic section of the green channel of the H2 hologram is written at the zone 1224 at each laser flash.

Since the green object radiation illuminates not only the hologram originally written by the green master channel but also the holograms written by the red and blue channels it is necessary to suppress the parasitic diffraction due to the other two channels. In the embodiment of FIG. 13(*a*) this is done by installing a small line-pass interference filter at 1224. In the embodiment of FIG. 13(*b*) this is done automatically by the Bragg selection properties of the thicker emulsion layer that is used in this case. In the embodiment of FIG. 13(*c*) widely differing azimuthal angles are used to ensure that the parasitic radiation falls outside the zone delineated by 1224. Finally, it is also possible to ensure the absence of parasitic diffraction at 1224 by choosing to record three separate H3 holograms and transferring each hologram, one at a time, to the final panchromatic H2.

By changing the size of the reference beam 1216 and the aperture 1224 larger or smaller sections of the H2 can be written in parallel. However, the zeroth order diffracted beam 1218 produced by the H3 must not illuminate the photosensitive material 1220. The angles of the lines 1222 and 1223 determine the final viewing angle range of the H2 hologram. Thus effectively, for a given H3:H2 distance, the altitudinal H3 recording angle determines the maximum practical size of the H2 section that can be written at each flash for a given H2:H3 distance. The consideration of parasitic reflection from the H3 both on recording and replay usually constrains the choice of altitudinal angle to around the Brewster's angle.

During writing, both the H2 hologram 1220 and the H3 hologram 1219 are moved electromechanically together while the mask 1221 is kept stationary as indicated by the arrows in FIG. 12 (the movement is also out of the paper in FIG. 12 as well as in the horizontal direction). At each laser flash adjacent macroscopic zones 1224 of the H2 are recorded. These zones may be strictly adjacent or may be overlapped somewhat in order to remove any grid-like effect on the final hologram.

Both the red and blue channels of the device function identically to the green channel here described. The zone 1252 (with optional line-pass interference filter) locates the blue H2 writing zone. The red writing zone is not shown. The distances between the various writing zones that correspond to the different colour channels should be chosen carefully so the different colour writing zones fall exactly on top of each other in the final hologram. If this is not done discolouration problems may be observed. This is illustrated in FIG. 14 which shows a slice through the H3 (1404) and H2 (1405) viewed from the side. Reference beams (green-1401, red-1402 and blue-1403) illuminate the zones 1406, 1407 and 1408 on the H3. Aperture mask 1405, corresponding to 1221 of FIG. 12, defines the H2 green (1410), red (1411) and blue (1412) writing zones. These zones will be referred to hereinafter as super-pixels as they are the holographic pixels of the H2 but are themselves composed of many H3 pixels which are out of the H2 plane and so are somewhat defocused. The holographic H2 substrate 1409 is shown grossly thicker than in reality in order to indicate the relative position of H2 super-pixels clearly. At the first laser flash just three super-pixels are written (1410, 1411 and 1412). Before the next laser flash the H2 and H3 are advanced by a distance 1422 and an extra three super-pixels are written as shown on the displaced H2 1414. After the third flash the H2 looks like 1415 and after a number of flashes the H2 looks like 1416. Note that regions 1417 and 1418 now show the different colour super-pixels beginning to overlap. 1426 shows a final portion of the H2 where all three colours have completely overlapped. Thus 1423, 1425 and 1424 are each composed of green, red and blue exactly-superimposed super-pixels.

In order to ensure exact overlap of different colour H2 super-pixels the distances 1420 and 1421 are both exactly divisible by the H2/H3 advance distance 1422. If the super-pixel width 1419 corresponds to the H2/H3 incremental advance distance 1422 (as in fact shown in FIG. 14) then all pixels of one colour sit exactly side by side without overlap.

However, some super-pixel overlap can be advantageous and thus the distance 1422 may be chosen to be a little smaller than 1417.

All the reference beams (FIG. 12—green 1223, blue 1275, red not shown) are carefully adjusted to have exactly the same altitudinal and azimuthal angles of incidence. The angle of azimuthal incidence should usually be chosen such that the final hologram may be viewed by an overhead light as would normally be required. Slight differences in the angles of incidence between the various colours leads to non-registration of the various chromatic images in the H2 hologram.

Typically, the H3 hologram is written with holographic pixels of 2 mm diameter. The different colour components are made to overlap perfectly so that red, green and blue pixels are always printed one on top of the other. The form of the H3 holographic pixel is quasi-rectangular so only a little overlapping is required to attain full and even coverage of the H3 substrate. Preferably, the Fourier plane of each object beam coincides with the H3 substrate plane although some offset distance can be used if required. Typical H3 hologram sizes produced by the embodiment of FIG. 12 vary from 30×40 cm to 1 m×1 m. Larger sizes may be generated by simply changing the electromechanical advancement mechanisms of the device. Since the H3 is preferably a transmission type of hologram it is possible to use a panchromatic fine-grain recording material (grain size ~40 nm) for writing the H3 without problem. This allows very low energies to be used for writing the H3 and also helps considerably when the H3 is transferred to an H2 hologram. To write an H3 hologram appropriate for transfer to a 1 m×1 m H2 takes around 200 minutes.

In the H3:H2 transfer mode, for each colour channel, typically around 1000 pixels on the H3 (~40 cm$^2$) are illuminated (by beams 1217 and 1272 and not shown for red). The write size at each laser flash on the H2 is around 4 cm$^2$ (e.g. 1224, 1252 and not shown for red) or around 10 times smaller. This allows an H2 hologram of 1 m×1 m to be written in around 2 minutes.

Since the H2 hologram is a reflection hologram a standard fine-grain emulsion (grain size ~40 nm) cannot be used effectively as Raleigh scattering in the blue channel is too great. Therefore, a panchromatic emulsion having a grain size of around 25 nm is preferably used. Although this material has a rather lower sensitivity than a normal fine grain emulsion (e.g. around 1 mJ/cm$^2$ in the green) the fact that the writing zone on the H2 is usually around 10 times smaller than the illumination area on the H3 means that the energy required in the H2 reference is of the same order of magnitude as that required by the H3 illumination beam. Typically in the green around 2 mJ is required to write the H3 and around 15 mJ to write the H2 (of which 75% is required for illumination of the H3). Figures are similar for the red and blue components.

3-D Data

As described above, an H3 is produced from transformed 3-D digital data that are displayed on various LCDs within the device. How this 3-D data is defined, transformed and used will now be described.

In one embodiment a computer is used to generate a three dimensional model of an object using a standard commercial computer program. Such computer programs can produce very lifelike models using a variety of sophisticated rendering processes that mimic real life effects. In addition advances in computer technology have now seen the calculation times, required for such programs to run, dramatically decreased. Three dimensional scanners using Moire or other principles now permit the incorporation of real world 3-D images in such computer models. The storage memory required for such 3-D models is largely dependent on the texture maps used therein and hence computer files representing such 3-D models are usually relatively small and may be transmitted over the internet easily. In the preferred embodiment such 3-D computer models are used to generate a series of 2-D camera views from a virtual viewing plane as shown in FIG. 9. Here the viewing plane is labeled 901 and individual 2-D perspective camera images, such as 905 and 904, of the computer represented object 1100 are generated at multiple locations on the viewing plane such as 902 and 903. The spacing and density of such 2-D views are generally controlled according to the information required for a certain type of hologram but in one embodiment they form a regular 2-D matrix and in another a regular horizontal 1-D array. In another embodiment a real model is used instead of a computer representation and a real camera is employed to record individual photographs (either digitally or via photographic film that is subsequently digitized). In such a case FIG. 9 should be interpreted in the following fashion. Object 900 represents the object to be holographed. 901 represents the plane on which a camera 902 is positioned and photographs of the object 900 are taken at a variety of positions on this plane. For example, the view position 906 yields the photograph 905 and the view position 903 yields the photograph 904. Generally some mechanism is used to transport a camera from position to position in a sequential fashion using a 1 or 2 dimensional translation stage to accomplish this. As before, the spacing and density of such 2-D views are generally controlled according to the information required for a certain type of hologram but in one embodiment they form a regular 2-D matrix and in another a regular horizontal 1-D array.

In both of the above cases restricted animation, which may be transferred to the final hologram, may be modeled by arranging that the model 900 moves in a defined sense (representing such animation) as different camera positions are selected on the plane 901, such camera positions following sequential monotonic trajectories on the plane. On observing the final hologram, an observer following such sequential monotonic trajectory in the observation space will perceive the animation.

Mathematical Definition of 3-D Data

The preferred embodiment defines a set of 2-D views of a real or computer represented object 900 on a certain viewing plane 901 (for several colours) and processes such views digitally to generate data (e.g. 904, 905) that is displayed on spatial light modulators which form part of the holographic printer. Cartesian coordinates $\xi$ and $\zeta$ may be defined to represent respectively the x and y directions on the viewing/camera plane 901. The origin of this coordinate system may be defined as the bottom left hand corner of 901. The plane 901 can be discretized as follows:

$$\xi = (k-1)\frac{\Xi}{(N_K - 1)}, \quad k = 1, \ldots, N_K \qquad (1)$$

$$\zeta = (g-1)\frac{\Theta}{(N_G - 1)}, \quad g = 1, \ldots, N_G \qquad (2)$$

where the integers k and g label perspective view locations on 901. A grid of ($N_K \times N_G$) perspective views is therefore envisaged covering the plane 901 which has dimensions $\Xi \times \Theta$ (FIG. 10).

The Cartesian coordinates x and y may be defined to describe each perspective view of size $Q_X \times Q_Y$ (e.g. 904, 905). Again an origin at the bottom left-hand corner is used and discretization is as above:

$$x = (i-1)\frac{Q_X}{(N_I - 1)}, \quad i = 1, \ldots, N_I \qquad (3)$$

$$y = (j-1)\frac{Q_Y}{(N_J - 1)}, \quad j = 1, \ldots, N_J \qquad (4)$$

A grid of ($N_I \times N_J$) pixels is therefore envisaged covering each perspective view with each such view having dimensions of $Q_X \times Q_Y$ (FIG. 11).

If it is desired to model a full-parallax 3-D scene then the luminous intensity tensor is defined as $^{kg}I_{ij}$. This tensor represents the totality of information describing the 3-D scene. It can either be provided by multiple photographic data or as the output of a standard commercial 3-D modeling program. In the case of horizontal parallax holograms the index g is fixed and the luminous intensity tensor may be defined simply as $^kI_{ij}$.

Transformation of Basic Data for H3 Writing

In order to discuss basic H3 transformation algorithms, it is necessary to define three more coordinate systems. The H3 hologram may be regarded as being composed of many holographic pixels ($N_A \times N_B$), the location of each of which is described by the Cartesian system (X,Y). Adopting the notation, $$X = (\alpha - 1)\frac{D_3}{(N_A - 1)} \quad \alpha = 1, \ldots, N_A \qquad (5)$$

$$Y = (\beta - 1)\frac{R_3}{(N_B - 1)} \quad \beta = 1, \ldots, N_B \qquad (6)$$

where $D_3$ represents the H3 hologram (horizontal) width and $R_3$ the H3 hologram height (FIG. 11).

For the desired H2 hologram the same coordinate system as has been previously introduced for the perspective views can be used, namely:

$$x = (i-1)\frac{D_2}{(N_I - 1)}, \quad i = 1, \ldots, N_I \qquad (7)$$

$$y = (j-1)\frac{R_2}{(N_J - 1)}, \quad j = 1, \ldots, N_J \qquad (8)$$

where it is arranged that $Q_X = D_2$ = the (horizontal) width of the H2 hologram and $Q_Y = R_2$ = the height of the H2 (FIG. 10). This choice amounts to a particular choice of how the cameras shown in FIGS. 9–11 are set up or alternatively how the rendering output from commercial 3-D programs is configured. In the case of 3-D programs it is also the choice of minimum rendering computation or what is referred to sometimes as a "centred camera". Physically this choice amounts to generating rendered 2-D perspective data only for the actual H2 hologram area. Thus each camera shot of FIG. 11 is arranged to see the object 900 through a window defined by the area of the H2 hologram. Alternatively, if the camera views 904 and 905 are re-projected onto the H2 plane (1101) using the same paraxial camera optics as were used to generate these photographs then by the use of a suitable clipping window it can be arranged that both shots exactly fill the H2 hologram area at the H2 plane—or equivalently points 1103, 1102, 1104 and 1105 on the H2 plane 1101 may be constructed to correspond respectively to 1103, 1102, 1104 and 1105 on the view-planes 904 and 905 (and all others).

As described above, digital data for each colour channel is written onto the H3 hologram by displaying such data onto a miniature 2-D LCD display and then illuminating such display with laser radiation and sharply focusing such radiation to form a holographic pixel near or at the surface of the H3 plane. The optical objective that performs this focalization will be regarded as being perfectly paraxial for the moment. This makes it possible to derive a series of simple paraxial data transformations. These transformations are then preferably modified for the inclusion of finite optical objective distortion.

By assuming a paraxial optical objective between LCD and the H3, a projected LCD image plane coincident with the viewing plane can be defined which is geometrically similar to the LCD plane. The location of a pixel on a given LCD image is therefore defined by its projected x and y Cartesian coordinates (u,v) on the viewing plane where, $$u = (\mu - 1)\frac{\Pi}{(N_M - 1)}, \quad \mu = 1, \ldots, N_M \qquad (9)$$

$$v = (\nu - 1)\frac{\Sigma}{(N_V - 1)}, \quad \nu = 1, \ldots, N_V \qquad (10)$$

The parameters $N_M$ and $N_V$ are defined by the LCD used (typically $N_M$ is 1024 and $N_V$ is 768) although these parameters may be degraded by doubling or tripling up on pixels if such high angular resolution is not required. These parameters together with the objective field of view essentially determine the angular resolution of the H3 and in all usual cases that of the H2. The parameters $\Pi$ and $\Sigma$ respectively represent the projected horizontal and vertical dimensions of the LCD at the viewing plane. A tensor quantity $^{\mu\nu}S_{\alpha\beta}$ may be defined which will be referred to hereinafter as the paraxial mask tensor. This quantity defines the luminous intensity (as a function of $\mu$ and $\nu$) that must be written onto a given colour channel LCD for the H3 pixel defined by ($\alpha$, $\beta$) assuming paraxial optics. In order to write an H3 hologram from readily available digital data a set of transformations must be derived that allow $^{\mu\nu}S_{\alpha\beta}$ to be calculated from $^{kg}I_{ij}$.

H3 Paraxial Mask Tensor Transformations

The transformation laws that make the conversion from I to S depend on H2 viewing geometry considerations and the required H2 hologram parallax. For clarity several cases will be considered.

(I) Full Parallax Image with Fixed
    Rectangular Viewing Window

FIG. 15 shows an overhead section view of the H2 (1501), H3 (1502) and viewing window (1503). FIG. 16 shows a side view of the same situation. It is assumed that the H2, H3 and viewing window are parallel to one another and that they are centred. It is further assumed that the viewing window and camera plane are geometrically identical and collocated. Both of these planes are of the same vertical and horizontal size as the H2 hologram. It is apparent that $\Xi=D_2$ and $\Theta=R_2$. The H2 and H3 planes are separated by a distance a and the viewing/camera and H2 planes by a distance h.

The numerical data are rendered using a computational objective lens having the same horizontal effective field of view (FOV) as the paraxial FOV of the actual hologram writing objective (as apodised by the LCD) and h is chosen such that $h=D_2 \cot(\theta/2)$ where $\theta$ is the objective and rendering (horizontal) FOV. Since a centred camera model is used, for camera position 1506 data is only rendered between the clipping planes 1508 and 1509. Thus it is apparent from FIG. 15 that $\Pi=2D_2-2\epsilon$, where $\epsilon=\alpha D_2/h$, and with a centred camera (discussed above) $Q_x=D_2$.

The writing of the holographic pixel 1504, whose coordinates on the H3 are (X,Y), and more specifically the individual ray, 1505, will now be considered. The brightness and colour information concerning this ray are contained in the camera shot taken at the horizontal camera coordinate $\xi$ (at 1506 since the viewing window is regarded as being geometrically identical to the camera tracking window) and corresponds to a horizontal picture coordinate of x at 1507 (since H2 is regarded as being geometrically identical to, and collocated with, each and every camera picture window). Thus $$u=D_2-\epsilon+w \tag{11}$$

$$\xi=X-\epsilon+w \tag{12}$$

Using these two equations and the definitions of $\xi$, X and u the following is obtained:

$$(\mu-1)\frac{\Pi}{(N_M-1)} = D_2 + (k-1)\frac{\Xi}{(N_K-1)} - (\alpha-1)\frac{D_3}{(N_A-1)}, \tag{13}$$

which then leads to an index transformation rule for k:

$$k = \frac{(N_K-1)}{D_2}\frac{(\alpha-1)(D_2+2\varepsilon)}{(N_A-1)} + 2\frac{(N_K-1)}{D_2}\frac{(\mu-1)(D_2-\varepsilon)}{(N_M-1)} - N_K + 2, \tag{14}$$

which on the use of the relation $\epsilon=\alpha D_2/h$ simplifies to $$k = 1+(N_K-1)\left[\frac{(\alpha-1)(1+2a/h)}{(N_A-1)} + 2\frac{(\mu-1)(1-a/h)}{(N_M-1)} - 1\right] \tag{15}$$

Now, by similar triangles it can be seen from FIG. 15 that $$\frac{h-a}{w} = \frac{a}{X-\varepsilon-x}. \tag{16}$$

Substituting the definitions of X and x the following is obtained:

$$\frac{(\alpha-1)(D_2+2\varepsilon)}{(N_A-1)} - \varepsilon - \frac{(i-1)D_2}{(N_I-1)} = \left[\frac{a}{h-a}\right]\left[2\frac{(\mu-1)(D_2-\varepsilon)}{N_M-1} + \varepsilon - D_2\right] \tag{17}$$

from whence the index transformation rule for i is derived:

$$i = 1 + \frac{(N_I-1)(\alpha-1)\left(1+\frac{2a}{h}\right)}{(N_A-1)} + \frac{(N_I-1)a\left(\frac{a}{h}-2(\mu-1)\right)}{(N_M-1)(h-a)} \tag{18}$$

In order to derive index transformation rules for g and j, it is necessary to study FIG. 16 which shows a projection of rays in the y-z plane. As before 1501 represents the H2, 1502 the H3 and 1503 the viewing plane.

The assumption is made that the LCD used to write the digital data has the same height to length ratio as the viewing zone and the required H2 hologram. This is a special case and will not always be true. However, it allows a simpler derivation of the equations to be presented before going on to generalize. The numerical data are rendered using a computational objective lens having the same effective field of view (FOV) in both the horizontal and vertical directions as that of the actual paraxial hologram writing objective (as apodised by the LCD). Therefore, it can be seen from FIG. 16 that $\Sigma=2R_2-2\delta$, where $\delta=\alpha R_2/h$, and with a centred camera (with camera clipping planes 1606 and 1607), $Q_Y=R_2$.

Now, with further reference to FIG. 16, it is necessary to consider writing the holographic pixel 1504 whose coordinates on the H3 are (X,Y) and to consider the individual ray 1505. The brightness and colour information concerning this ray are contained in the camera shot taken at the vertical camera coordinate ç (at 1604 the viewing window is regarded as being geometrically identical to, and collocated with, the camera tracking window) and corresponds to a vertical picture coordinate of y at 1608 (since H2 is regarded as being geometrically identical to, and collocated with, each and every camera picture window). Thus $$v=R_2-\delta+\tau \tag{19}$$

$$\varsigma=Y-\delta+\tau \tag{20}$$

Using these two equations and the definitions of ç, Y and v the following is obtained:

$$(v-1)\frac{\Sigma}{(N_V-1)} = R_2 + (g-1)\frac{\Theta}{(N_G-1)} - (\beta-1)\frac{R_3}{(N_B-1)}, \tag{21}$$

which then leads to an index transformation rule for g:

$$g = \frac{(N_G-1)}{R_2}\frac{(\beta-1)(R_2+2\delta)}{(N_B-1)} + 2\frac{(N_G-1)}{R_2}\frac{(v-1)(R_2-\delta)}{(N_V-1)} - N_G + 2, \tag{22}$$

which on the use of the relation $\delta=\alpha R_2/h$ simplifies to $$g = 1 + (N_G - 1)\left[\frac{(\beta-1)\left(1+\frac{2a}{h}\right)}{(N_B-1)} + 2\frac{(v-1)\left(1-\frac{a}{h}\right)}{(N_V-1)} - 1\right] \quad (23)$$

By similar triangles it can be seen from FIG. 16 that $$\frac{h-a}{\tau} = \frac{a}{Y-\delta-y}. \quad (24)$$

Substituting in the definitions of Y and y gives $$\frac{(\beta-1)(R_2+2\delta)}{(N_B-1)} - \delta - \frac{(j-1)R_2}{(N_J-1)} = \left[\frac{a}{h-a}\right]\left[2\frac{(v-1)(R_2-\delta)}{N_V-1} + \delta - R_2\right] \quad (25)$$

from whence the index transformation rule for j is derived:

$$j = 1 + \frac{(N_J-1)(\beta-1)\left(1+\frac{2a}{h}\right)}{(N_B-1)} + \frac{(N_J-1)a\left(\frac{a}{h}-2(v-1)\right)}{(N_V-1)(h-a)}. \quad (26)$$

The H3 mask transformation for a double parallax hologram of viewing window size equal to H2 hologram size under the assumption that the LCD aspect ratio equals the H2 hologram aspect ratio can therefore be given as:

$$^{\mu\nu}S_{\alpha\beta}=^{kg}I_{ij} \text{ when } 0<k\leq N_K \text{ and } 0<g\leq N_G \quad (27)$$

and $0<i\leq N_I$ and $0<j\leq N_J=0$ otherwise
where $$k = 1 + (N_K-1)\left[\frac{(\alpha-1)\left(1+\frac{2a}{h}\right)}{(N_A-1)} + 2\frac{(\mu-1)\left(1-\frac{a}{h}\right)}{(N_M-1)} - 1\right] \quad (28)$$

$$i = 1 + \frac{(N_I-1)(\alpha-1)\left(1+\frac{2a}{h}\right)}{(N_A-1)} + \frac{(N_I-1)a\left(\frac{a}{h}-2(\mu-1)\right)}{(N_M-1)(h-a)} \quad (29)$$

$$j = 1 + \frac{(N_J-1)(\beta-1)\left(1+\frac{2a}{h}\right)}{(N_B-1)} + \frac{(N_J-1)a\left(\frac{a}{h}-2(v-1)\right)}{(N_V-1)(h-a)} \quad (30)$$

$$g = 1 + (N_G-1)\left[\frac{(\beta-1)\left(1+\frac{2a}{h}\right)}{(N_B-1)} + 2\frac{(v-1)\left(1-\frac{a}{h}\right)}{(N_V-1)} - 1\right]. \quad (31)$$

(II) General Aspect Ratio

A particular H3 mask transformation for the case of a fixed choice of hologram aspect ratio has been derived above. The constraint on aspect ratio will now be relaxed. The derivation for the index rules for k and i remain unchanged as the choice of choosing h such that $h=D_2 \cot(\theta/2)$ where $\theta$ is the objective horizontal FOV and $\Pi=2D_2-2\epsilon$ can be adopted. However, the index rules for g and j appear no longer to be the same as it is not possible to also choose h by requiring that $h=R_2 \cot(\omega/2)$ where $\omega$ is the vertical objective FOV and $\Sigma=2R_2-2\delta$ (unless of course the aspect ratio of the H2 and LCD were the same).

On examination of FIG. 17 it can be seen that only equation 19 is changed out of 19, 20 and 24. This equation now becomes $$v=\Sigma/2+\tau. \quad (32)$$

Using equation 20 and the definitions of v and Y the following expression is obtained:

$$\frac{(v-1)\Sigma}{N_V-1} = \frac{\Sigma}{2} + \frac{(g-1)\Theta}{N_G-1} - \frac{(\beta-1)R_3}{N_B-1} + \delta \quad (33)$$

which on the substitution of the auxiliary relations $\Theta=R_2$ $\delta=\alpha R_2/h$ $R_3=R_2-2\delta \quad (34)$ leads to the required index equation for g $$g = 1 + (N_G-1)\left[\frac{\Sigma}{R_2}\left\{\frac{(v-1)}{N_V-1}-\frac{1}{2}\right\} + \frac{(\beta-1)}{N_B-1}\left\{1-\frac{2a}{h}\right\} - \frac{a}{h}\right]. \quad (35)$$

Since equation 24 remains unchanged for the general aspect ratio case, the index rule for j also remains the same. The H3 mask transformation for a double parallax hologram of viewing window size equal to H2 hologram size for a general LCD and hologram aspect ratio may therefore be given as:

$$^{\mu\nu}S_{\alpha\beta}=^{kg}I_{ij} \text{ when } 0<k\leq N_K \text{ and } 0<g\leq N_G \quad (36)$$

and $0<i\leq N_I$ and $0<j\leq N_J=0$ otherwise
where $$k = 1 + (N_K-1)\left[\frac{(\alpha-1)\left(1+\frac{2a}{h}\right)}{(N_A-1)} + 2\frac{(\mu-1)\left(1-\frac{a}{h}\right)}{(N_M-1)} - 1\right] \quad (37)$$

$$i = 1 + \frac{(N_I-1)(\alpha-1)\left(1+\frac{2a}{h}\right)}{(N_A-1)} + \frac{(N_I-1)a\left(\frac{a}{h}-2(\mu-1)\right)}{(N_M-1)(h-a)} \quad (38)$$

$$j = 1 + \frac{(N_J-1)(\beta-1)\left(1+\frac{2a}{h}\right)}{(N_B-1)} + \frac{(N_J-1)a\left(\frac{a}{h}-2(v-1)\right)}{(N_V-1)(h-a)} \quad (39)$$

$$g = 1 + (N_G-1)\left[\frac{\Sigma}{R_2}\left\{\frac{(v-1)}{N_V-1}-\frac{1}{2}\right\} + \frac{(\beta-1)}{N_B-1}\left\{1-\frac{2a}{h}\right\} - \frac{a}{h}\right]. \quad (40)$$

(III) General Rectangular Viewing Window ($\Xi \times \Theta$)

The more complicated case of a general rectangular viewing zone that is not of the same dimensions as the H2 hologram will now be considered.

FIG. 18(*a*) shows an overhead section view of the H2 (1501), H3 (1502) and viewing window (1503). FIG. 19(*a*) shows a side view of the same situation. As before it is assumed that the H2, H3 and viewing window are parallel to one another and that they are centred. It is further assumed, as before, that the viewing window and camera plane are geometrically identical and collocated. However, these planes are no longer of the same vertical and horizontal size as the H2 hologram but are rather of horizontal dimension $\Xi$ and vertical dimension $\Theta$. As before the H2 and H3 planes are separated by a distance a and the viewing/camera and H2 planes by a distance h.

The numerical data is rendered using a computational objective lens having the same effective field of view (FOV) as that of the actual paraxial hologram writing objective (as apodised by the LCD) but now h is chosen such that generally $\Xi<2h\tan(\theta/2)-D_2$ and $\Theta<2h\tan(\omega/2)-R_2$ where $\theta$ is the horizontal objective FOV and $\omega$ is the vertical objective FOV (both as apodised by the LCD). This is different to the situation when a specific h was chosen to ensure 100% utilization of the LCD in the horizontal direction (i.e. $h=D_2\cot(\theta/2)$). As before it is arranged that $Q_x=D_2$ (centred camera).

With reference to FIG. 18a, the writing of the holographic pixel 1504 whose coordinates on the H3 are (X,Y) and the individual ray 1505 will be considered. The brightness and colour information concerning this ray are contained in the camera shot taken at the horizontal camera coordinate $\xi$ (at 1506 since the viewing window is regarded as being geometrically identical to the camera tracking window) and corresponds to a horizontal picture coordinate of x at 1507 (as the H2 is regarded as being geometrically identical to, and collocated with, each and every camera picture window). Thus $$u = \frac{\Pi}{2} + w \qquad (41)$$

$$\xi = X + w - \varepsilon + \frac{\Xi - D_2}{2}. \qquad (42)$$

Using these two equations and the definitions of $\xi$, X and u the following is obtained:

$$(k-1)\frac{\Xi}{(N_K-1)} = \qquad (43)$$

$$(\mu-1)\frac{\Pi}{(N_M-1)} + (\alpha-1)\frac{D_3}{(N_A-1)} - \frac{\Pi}{2} + \frac{\Xi-D_2}{2} - \varepsilon.$$

Using the auxiliary relations (readily evident from FIG. 18a)

$$\frac{\Pi}{2(h-a)} = \frac{\varepsilon}{a} \qquad (44)$$

$$D_3 = D_2 + 2\varepsilon$$

allows the following k index rule to be derived:

$$k = 1 + (N_K - 1) \qquad (45)$$

$$\left\{ \frac{1}{2}\left[1 - \frac{D_2}{\Xi} - \frac{\Pi h}{(h-a)\Xi}\right] + \frac{(\alpha-1)\left(D_2 + \frac{a\Pi}{h-a}\right)}{\Xi(N_A-1)} + \frac{(\mu-1)\Pi}{(N_M-1)\Xi} \right\}.$$

By similar triangles, with reference to FIG. 18(a), it can now be observed that:

$$\frac{w}{h-a} = \frac{X-x-\varepsilon}{a} \qquad (46)$$

from whence, using equations 41 and 44, the i index rule is obtained:

$$i = 1 + (N_I - 1)\left\{ \frac{(\alpha-1)\left(1 + \frac{a\Pi}{D_2(h-a)}\right)}{(N_A-1)} - \frac{a\Pi(\mu-1)}{D_2(h-a)(N_M-1)} \right\}. \qquad (47)$$

Similarly, exactly the same derivation from FIG. 19(a) may be performed in the vertical plane to derive index rules for j and g. Thus the (paraxial) mask transformation for a general sized rectangular viewing window ($\Xi \times \Theta$) may be given as:

$$^{\mu\nu}S_{\alpha\beta} = {}^{kg}I_{ij} \text{ when } 0<k\leq N_K \text{ and } 0<g\leq N_G \qquad (48)$$

and $0<i\leq N_I$ and $0<j<N_J=0$ otherwise where $$k = 1 + (N_K - 1) \qquad (49)$$

$$\left\{ \frac{1}{2}\left[1 - \frac{D_2}{\Xi} - \frac{\Pi h}{(h-a)\Xi}\right] + \frac{(\alpha-1)\left(D_2 + \frac{a\Pi}{h-a}\right)}{\Xi(N_A-1)} + \frac{(\mu-1)\Pi}{(N_M-1)\Xi} \right\}$$

$$i = 1 + (N_I - 1)\left\{ \frac{(\alpha-1)\left(1 + \frac{a\Pi}{D_2(h-a)}\right)}{(N_A-1)} - \frac{a\Pi(\mu-1)}{D_2(h-a)(N_M-1)} \right\} \qquad (50)$$

$$g = 1 + (N_G - 1) \qquad (51)$$

$$\left\{ \frac{1}{2}\left[1 - \frac{R_2}{\Theta} - \frac{\Sigma h}{(h-a)\Theta}\right] + \frac{(\beta-1)\left(R_2 + \frac{a\Sigma}{h-a}\right)}{\Theta(N_B-1)} + \frac{(\nu-1)\Sigma}{(N_V-1)\Theta} \right\}$$

$$j = 1 + (N_J - 1)\left\{ \frac{(\beta-1)\left(1 + \frac{a\Sigma}{R_2(h-a)}\right)}{(N_B-1)} - \frac{a\Sigma(\nu-1)}{R_2(h-a)(N_V-1)} \right\}. \qquad (52)$$

It is worth noting that the size of the H3 hologram can be reduced by the choice of a slightly different coordinate system. This choice is applicable to both the vertical and horizontal planes and is shown in FIGS. 18b and 19b. In the case of the horizontal plane, equation 44 is modified so:

$$D_3 = D_2 + \frac{\Xi - D_2}{h}. \qquad (53)$$

Likewise equation 42 becomes $$\xi = \frac{\Xi - D_2}{2} - \frac{a(\Xi - D_2)}{2h} + X + w \qquad (54)$$

and equation 46 becomes $$\frac{w}{h-a} = \frac{X-x}{a} - \frac{(\Xi - D_2)}{2h}. \quad (55)$$

Using these modified equations and the method described above a set of similar equations to 48–52 may be derived for such a modified H3.

It is to be noted that h was chosen such that generally $\Xi < 2h \tan(\theta/2) - D_2$ and $\Theta < 2h \tan(\omega/2) - R_2$ where $\theta$ is the horizontal objective FOV and $\omega$ is the vertical objective FOV (both as apodised by the LCD). This had enabled the LCD to write any format of hologram having any format of viewing window, but at the expense of not using all of the LCD. Thus generally one wants to chose either $\Xi \approx 2h \tan(\theta/2) - D_2$ or $\Theta \approx 2h \tan(\omega/2) - R_2$.

(IV) Single Parallax Limit

So far the general case of a full parallax (H2) hologram has been discussed. It is possible to simplify the general parallax mask transformations hereto presented for the single parallax case. Specifically, it is noted that $^{kg}I_{ij} = ^{k}I_{ij} \forall g$ where $^{k}I_{ij}$ represents the camera information corresponding to a vertically central camera position. Using this relation it is possible to simplify any general parallax mask transformation in order to arrive at the simpler single parallax mask transformations. In general the transformation rules for the g index are simply eliminated and replaced by vertical field-of-view restrictions on S.

(V) Unconstrained Viewing Window

The definition of a rectangular viewing window is not mandatory. Rather, by using all of the LCD, a class of mask transformation can be derived that lets every pixel in the H2 radiate over the same solid angle. Generally this embodiment is less preferred as the viewer may see an incomplete (H2) hologram image from many positions. With a rectangular window this is not the case—either the image is entirely viewable by the observer or it is not. It will be clear to those skilled in the art how to reproduce the above arguments for such a case.

Generalization to Non-Paraxial Optics

In useful objectives of large FOV that may be used to write H3 holograms, there is inevitably present significant optical distortion. It has been disclosed in WO01/04716 that for a particularly useful class of objectives, as the FOV was increased, so the optical distortion associated with a finite $5^{th}$ Seidel coefficient also increased. If the object and image planes of a given objective as in FIG. 20 are compared it is possible to characterize this distortion by the following transformation:

$$u = \frac{\Pi}{2} + \left(U - \frac{\Pi}{2}\right)\psi(U, V) \quad (56)$$

$$v = \frac{\Sigma}{2} + \left(V - \frac{\Sigma}{2}\right)\psi(U, V)$$

where $$\psi(U, V) = f\left(\sqrt{\left\{U - \frac{\Pi}{2}\right\}^2 + \left\{V - \frac{\Sigma}{2}\right\}^2}\right) \quad (57)$$

and f is a general function that describes the distortion. These equations may also be interpreted as a transformation from real to paraxial object planes. Thus, by simply replacing the expressions $$u = (\mu - 1)\frac{\Pi}{(N_M - 1)}, \quad \mu = 1, \ldots, N_M \quad (58)$$

$$v = (v - 1)\frac{\Sigma}{(N_V - 1)}, \quad v = 1, \ldots, N_V \quad (59)$$

by $$u = \frac{\Pi}{2} + \left[(\mu - 1)\frac{\Pi}{(N_M - 1)} - \frac{\Pi}{2}\right]\psi_{\mu\nu} \quad \mu = 1, \ldots, N_M \quad (60)$$

$$v = \frac{\Sigma}{2} + \left[(v - 1)\frac{\Sigma}{(N_V - 1)} - \frac{\Sigma}{2}\right]\psi_{\mu\nu} \quad v = 1, \ldots, N_V$$

in all preceding equations the paraxial mask transformations may be converted into finite distortion mask transformations. Hence, by way of example, the above relation can be substituted for u in equation 11 in order to derive a modified equation 13 and from there a modified k index rule (which would be the finite distortion k index rule). It is also possible to derive any finite distortion mask transformation using these rules and the information that has been hereto presented concerning paraxial mask transformations.

It is also possible to apply a simple distortion correction, based on the above equations after a paraxial mask transformation has been applied. Thus the paraxial mask tensor $^{\mu\nu}S_{\alpha\beta}$ may be calculated and then a distortion compensation transformation applied $$^{\sigma\eta}T_{\alpha\beta} = {}^{\mu\nu}S_{\alpha\beta} \quad (61)$$

where $$\sigma = \frac{N_M + 1}{2} + \left\{\mu - 1 - \frac{(N_M - 1)}{2}\right\}\psi_{\mu\nu} \quad (62)$$

$$\eta = \frac{N_V + 1}{2} + \left\{v - 1 - \frac{(N_V - 1)}{2}\right\}\psi_{\mu\nu}$$

to arrive at the final finite objective mask tensor T.

Other Distortions

Many other image distortions may arrive in a holographic printer. Such distortions may be due to emulsion swelling due to chemical processing, different wavelengths of reconstruction and recording, refractive index effects within the holographic material and changes in replay and recording reference beam angles, to name just a few. Without exception all of these distortions may be written in terms of a pixel swap transformation as with the finite objective distortion case. However, most distortions lack the symmetry properties of this particular case.

By combining all pixel swaps into a single finite distortion mask transformation it is possible to minimize computation and most importantly to minimize interpellation error. This is because the various indices such as $\mu$, $\nu$, $\alpha$, $\beta$, k and g are integers and yet the rules such as equation 37 contain real coefficients. As such a truncation error is encountered each time an index rule is applied in the calculation of the mask transformation. If many index swapping rules are applied, one after the other, one for each distortion and one for the paraxial mask transformation, then errors are accumulated.

By incorporating in a single transformation describing all of the distortions present in the system it is possible to eliminate this index truncation accumulation.

Generalization to Full Colour

The algorithms presented above are equally applicable to each and every colour component hologram and its data. Where different optical distortions in the printer exist for the different writing wavelengths it is clear that care must be taken in order to use the correct distortion functions for each colour channel. Colour mixing and balancing may be done both at the H3 and H2 stage and the relative energies in each chromatic channel should be adjusted according to the desired visual result of the final hologram.

Limits

As the parameter a of FIG. 15 approaches zero the limit of "direct-write"—or the 1-step digital hologram limit—is arrived at. The H3 then written is a transmission hologram rather than a reflection hologram although the object data then recorded on this hologram is the same object data that would be recorded using the direct-write (1-step) technique.

As the parameter a approaches "h" the limit of "H1 master-write" is arrived at. Here the object data now written on the H3 is the same as the object data written with the Master-Write technique.

It will be appreciated that according to the preferred embodiment these extreme limits are not used. Rather, by using a general case in which $0<\alpha<h$ many of the problems inherent with the known devices can be solved.

Although the preferred embodiment has been discussed above, it is apparent that various modifications may be made. For example, many different types of laser may be used. Pulsed lasers are particularly preferable as these lasers render the resulting printer immune from vibration. However, CW lasers may also be used for certain applications if the exposure time of a given holographic pixel or super-pixel is kept short enough. Thus, for example HeNe, Krypton, Argon, Neodymium, dye or HeCd lasers may be employed.

A wide variety of pulsed laser sources may be used. Lasers that produce chromatic emissions that when added together (as in the standard chromaticity chart) produce a wide range of visually perceived colours are preferred. In addition conventional light sources are expected to be used for illuminating holograms made with such chromatic emissions and therefore the photographic recording materials used should be sensitive to these emissions.

With these considerations in mind the mechanism that has been described above by which the blue laser emission is generated may be replaced by a Nd:YAG oscillator and amplifier(s) functioning at 946 nm and a means for frequency doubling to 473 nm. This emission has advantages of lower Raleigh scattering and better visual perception. Clearly similar emissions based the atomic transitions of Neodymium in matrices other than YAG may be employed.

The mechanism that has been described above by which both the blue and red laser emissions are generated may be replaced by a Tm doped laser oscillator and amplifier(s). For example, Tm:YAL may be used such as $KYb_{0.45}Y_{0.43}Tm_{0.07}(WO_4)_2$ functioning at 1850–1970 nm and a means for frequency tripling to 617–657 nm and quadrupling to 463–493 nm. These emissions have the advantage of better visual perception.

Other pulsed or CW laser sources may be used in combination with H2 emulsion swelling, H2 reference beam angle adjustment and digital data distortion correction in order to produce undistorted white-light viewable holograms that replay at different wavelengths than their recording wavelengths.

In most cases holograms must be displayed using a point source. This means that the replay reference beam is generally diverging and thus light rays hitting the final hologram on replay are not all at the same angle. In the above discussion a preferred embodiment has been disclosed wherein the H2 reference beam angle and the H2 reference beam divergence for each chromatic component remain constant during the H3:H2 transfer. However, the arrangement can be modified so that both the H2 reference beam divergence and the H2 reference beam (altitudinal and azimuthal) angles change from super-pixel to super-pixel. In this way the reference ray geometry at recording may be precisely matched to the reference ray geometry on final replay.

If the replay point source is far enough away and the H2 super-pixel is small then only the reference beam angles (altitudinal and azimuthal) need be changed. As the replay point source becomes closer to the final hologram, however, if the H2 reference beam divergence on recording is not adjusted at each super-pixel location, image blurring and/or distortion may occur.

The embodiment described with reference to FIG. 12 may be modified by the insertion of a method for changing the reference beam angle and divergence between elements 1252 and 1251 (and similar methods for the other 2 colour channels). Care must be taken to ensure that the resulting modified reference beam hits its desired target (in this case the zone 1252) with sufficient positional stability. In this way the reference beam 1275 is always directed towards zone 1252 and yet the altitudinal and azimuthal angles of incidence of 1275 at 1252, as well as (optionally) the divergence of 1275, are controlled and changed at every laser shot (and similarly for the other two colour channels).

This technique is also important for when a large hologram is to be constructed from many small holographic tiles. In this case H2 reference beam control is highly desirable.

In some cases the need for adjusting the beam divergence at each H2 super-pixel can be eliminated by pre-distortion of the data and some adjustment of local colour balance.

For each H2 emulsion type there generally exists an optimum H3/H2 energy ratio for each colour and an optimum total energy for each colour. It may be desired to use the same H3 to write H2 holograms on different emulsions that are designed for different viewing conditions (i.e. light locations). In many conventional devices (e.g. contact copying) this flexibility is not provided for.

By use of modern thermoplastics H3 transmission holograms can be recorded without the need for chemical processing and without the need for removal of the H3 from the printing machine. A thermoplastic H3 may be overwritten and may thus form a semi-permanent part of the printer. In other cases a thermoplastic H3 may be loaded into the printer as a roll which is replaced from time to time. In other cases such a roll may be used to store several H3 holograms and the printer control system may select which one to load for H3:H2 printing.

Photopolymers may also be used for the H3, in which case optical processing accessories may be included within the printer and the photopolymer may be installed in a cartridge or roll system that is to be replaced from time to time.

The preferred embodiment may be modified to produce reflection type H3 holograms by inclusion of suitable mirrors within the space between the H3 and H2 during copy. The mirrors direct various chromatic reference beams to the zones 1252 and 1224 etc on the H2 from the side of the H3 (and hence the hologram is a reflection hologram). Generally this is a less preferred embodiment as such mirrors severely restrict the minimum H3:H2 distance attainable.

In the preferred embodiment symmetric super-pixels are used. However, with the availability of larger laser energies on H3:H2 transfer a super-pixel that is essentially rectangular wherein one dimension is small compared to the hologram linear dimension and the other dimension which is now equal to the linear dimension of the H2 hologram. In this way a 1-dimensional set of displacements is performed during H3:H2 transfer instead of a 2-dimensional set i.e. the H3 is transferred to the H2 slit by slit, instead of rectangle by rectangle.

The use of highly asymmetric super-pixels may only be performed in one direction as it is required, for example, that the zeroth order transmitted radiation produced by 1217 is occluded by the slit 1221.

Where H3:H2 transfers must be accomplished very fast then highly asymmetric super-pixels are to be preferred.

The invention claimed is:

1. A 2-step holographic printer wherein:
   in a first mode of operation said holographic printer produces at least one intermediate hologram (H3), said intermediate hologram (H3) being formed on a first substrate; and
   in a second mode of operation said holographic printer produces a white light viewable hologram (H2) from said at least one intermediate hologram (H3), said white light viewable hologram being written on a second substrate that is positioned parallel to said first substrate and at a distance d from said first substrate where d is greater than zero and less than the distance between a camera (H1) plane and the white light viewable hologram (H2) plane.

2. A 2-step holographic printer as claimed in claim 1, further comprising at least one pulsed laser source.

3. A 2-step holographic printer as claimed in claim 2, wherein a pulsed laser source produces a laser emission having a wavelength selected from the group consisting of: (i) 946 nm; (ii) 1047 nm; (iii) 1053 nm; (iv) 1064 nm; (v) 1070 nm; (vi) 1080 nm; (vii) 1313 nm; (viii) 1319 nm; (ix) 1338 nm; (x) 1341 nm; (xi) 1351 nm; and (xii) 1850–1970 nm.

4. A 2-step holographic printer as claimed in claim 3, wherein a laser emission is frequency doubled to a wavelength selected from the group consisting of: (i) 473 nm; (ii) 523.6 nm; (iii) 526 nm; (iv) 532 nm; (v) 535 nm; (vi) 539.8 nm; (vii) 656.5 nm; (viii) 659 nm; (ix) 669 nm; (x) 670.7 nm; and (xi) 675.5 nm.

5. A 2-step holographic printer as claimed in claim 3, wherein a laser emission is frequency tripled to a wavelength selected from the group consisting of: (i) 437.7 nm; (ii) 440 nm; (iii) 446.0 nm; (iv) 447.1 nm; (v) 450.3 nm; and (ii) 617–657 nm.

6. A 2-step holographic printer as claimed in claim 3, wherein a laser emission is frequency quadrupled to a wavelength in the range 463–493 nm.

7. A 2-step holographic printer as claimed in claim 2, wherein a pulsed laser source is selected from the group consisting of: (i) Nd:BEL; (ii) Nd:YAG; (iii) Nd:YAP; and (iv) Nd:YLF.

8. A 2-step holographic printer as claimed in claim 2, wherein a pulsed laser source is selected from the group consisting of: (i) Tm:YAG; (ii) Tm:YAL; and (iii) Thulium in a host matrix of Potassium Yttrium Ytterbium Tungstate.

9. A 2-step holographic printer as claimed in claim 2, wherein at least one pulsed laser source is configured to produce laser emissions of single longitudinal mode.

10. A 2-step holographic printer as claimed in claim 2, wherein at least one pulsed laser source is configured to produce laser emissions having a temporal coherence length greater than 1 mm.

11. A 2-step holographic printer as claimed in claim 2, wherein at least one pulsed laser source comprises a means for modifying the laser emission wavelength by Raman scattering or Raman amplification.

12. A 2-step holographic printer as claimed in claim 2, wherein in said second mode the output from said at least one pulsed laser source is amplified.

13. A 2-step holographic printer as claimed in claim 2, wherein said at least one pulsed laser source comprises two pulsed laser sources.

14. A 2-step holographic printer as claimed in claim 13, wherein a laser emission from a first pulsed laser source is frequency doubled to generate a green laser beam.

15. A 2-step holographic printer as claimed in claim 13, wherein a laser emission from a second pulsed laser source is frequency doubled to generate a red laser beam.

16. A 2-step holographic printer as claimed in claim 13, wherein a laser emission from a second pulsed laser source is frequency trebled to generate a blue laser beam.

17. A 2-step holographic printer as claimed in claim 1, further comprising at least one CW laser source.

18. A 2-step holographic printer as claimed in claim 17, wherein said at least one CW laser source is selected from the group consisting of: (i) HeNe laser; (ii) Krypton laser; (iii) Argon laser; (iv) Neodymium laser; (v) dye laser; and (vi) HeCd laser.

19. A 2-step holographic printer as claimed in claim 1, wherein red and/or green and/or blue laser beams are generated for writing holograms.

20. A 2-step holographic printer as claimed in claim 19, wherein said red laser beam has a wavelength in the range 615–680 nm, said green laser beam has a wavelength in the range 510–550 nm, and said blue laser beam has a wavelength in the range 430–480 nm.

21. A 2-step holographic printer as claimed in claim 1, wherein said final white light viewable hologram comprises an RGB white light viewable reflection hologram.

22. A 2-step holographic printer as claimed in claim 1, further comprising at least one spatial light modulator onto which digital data is displayed.

23. A 2-step holographic printer as claimed in claim 22, wherein said digital data is derived from a real model.

24. A 2-step holographic printer as claimed in claim 22, wherein said digital data is derived from a 3-D computer model.

25. A 2-step holographic printer as claimed in claim 22, wherein said digital data is mathematically transformed to correct for optical distortion.

26. A 2-step holographic printer as claimed in claim 25, wherein said optical distortion is selected from the group consisting of: (i) H2 emulsion swelling on hologram processing; (ii) reference beam angle errors; (iii) finite emulsion refractive index and emulsion refractive index not equaling recording material substrate refractive index; (iv) required H2 replay wavelength not equaling recording wavelength; (v) required H2 replay reference angle not equaling recording reference angle; and (vi) intrinsic optical distortion of the printer including distortion due to the principle objective(s).

27. A 2-step holographic printer as claimed in claim 25, wherein said digital data is mathematically transformed by a single simple pixel swap that operates between an initial image data set and a data set displayed on said at least one spatial light modulator.

28. A 2-step holographic printer as claimed in claim 25, wherein said digital data is mathematically transformed by a series of simple pixel swaps.

29. A 2-step holographic printer as claimed in claim 1, further comprising positioning means for positioning said first substrate so that a holographic pixel is written on said first substrate.

30. A 2-step holographic printer as claimed in claim 29, wherein said positioning means moves said first substrate so that an array of holographic pixels is formed thereon.

31. A 2-step holographic printer as claimed in claim 30, wherein different color holographic pixels are recorded at the same position on said first substrate so that said different color holographic pixels overlap one another.

32. A 2-step holographic printer as claimed in claim 30, wherein different color holographic pixels are recorded at different positions on said first substrate so that said different color holographic pixels do not substantially overlap one another.

33. A 2-step holographic printer as claimed in claim 1, wherein said at least one intermediate hologram (H3) is selected from a group consisting of: (i) a transmission hologram; and (ii) a reflection hologram.

34. A 2-step holographic printer as claimed in claim 1, wherein said at least one intermediate hologram (H3) comprises a transmission hologram and wherein said first substrate is selected from the group consisting of: (i) a photosensitive medium; (ii) a thermoplastic substrate; (iii) a photopolymer substrate; and (iv) a silver halide emulsion coated substrate.

35. A 2-step holographic printer as claimed in claim 1, wherein said at least one intermediate hologram (H3) comprises a reflection hologram and wherein said first substrate comprises a photosensitive medium.

36. A 2-step holographic printer as claimed in claim 1, wherein in said second mode a first order diffracted beam is produced due to said intermediate hologram (H3).

37. A 2-step holographic printer as claimed in claim 1, wherein the distance d is greater than zero and less than ¼ of the height of said at least one intermediate hologram.

38. A 2-step holographic printer as claimed in claim 1, wherein the distance d is greater than zero and less than ¼ of the width of said at least one intermediate hologram.

39. A 2-step holographic printer as claimed in claim 1, further comprising a mask arranged adjacent said second substrate so that a portion of a diffracted beam illuminates said second substrate.

40. A 2-step holographic printer as claimed in claim 1, wherein a zeroth order diffracted beam is substantially prevented from illuminating said second substrate.

41. A 2-step holographic printer as claimed in claim 1, further comprising at least one line-pass optical filter placed between the first substrate and the second substrate.

42. A 2-step holographic printer as claimed in claim 41, wherein said at least one line-pass optical filter comprises an interference filter.

43. A 2-step holographic printer as claimed in claim 1, wherein super-pixels comprising superimposed red, green, and blue holographic pixels are written on to said second substrate.

44. A 2-step holographic printer as claimed in claim 43, wherein said super-pixels do not substantially overlap.

45. A 2-step holographic printer as claimed in claim 43, wherein said super-pixels partially overlap.

46. A 2-step holographic printer as claimed in claim 1, wherein said white light viewable hologram (H2) is a reflection hologram.

47. A hologram produced by a 2-step holographic printer as claimed in claim 1.

48. A hologram as claimed in claim 47, wherein said hologram is selected from the group consisting of: (i) a single parallax hologram; and (ii) a full parallax hologram.

49. A method of printing a hologram, comprising:
producing at least one intermediate hologram (H3) on a first substrate in a holographic printer;
positioning a second substrate parallel to said first substrate and at a distance d from said first substrate where d is greater than zero and less than the distance between a camera (H1) plane and a white light viewable hologram (H2) plane; and
using said same holographic printer to produce the white light viewable hologram (H2) on said second substrate from said at least one intermediate hologram (H3).

50. A holographic copying device comprising an apparatus wherein:
said copying device generates an undistorted white light viewable hologram (H2) from at least one intermediate hologram (H3), said at least one intermediate hologram (H3) having been written on a first substrate and said white light viewable hologram (H2) being written on a second substrate; and
said second substrate is positioned parallel to said first substrate and positioned at a distance d from said first substrate where d is greater than zero and less than the distance between a camera (H1) plane and the white light viewable hologram (H2) plane.

51. A holographic copying device as claimed in claim 50, wherein the distance d is greater than zero and less than ¼ of the height of said at least one intermediate hologram.

52. A holographic copying device as claimed in claim 50, wherein the distance d is greater than zero and less than ¼ of the width of said at least one intermediate hologram.

53. A holographic copying device as claimed in claim 50, wherein said at least one intermediate hologram (H3) is selected from the group consisting of: (i) a transmission hologram; and (ii) a reflection hologram.

54. A holographic copying device as claimed in claim 50, further comprising at least one pulsed laser source.

55. A holographic copying device as claimed in claim 54, wherein said at least one pulsed laser source comprises two pulsed laser sources.

* * * * *